United States Patent
Zheng et al.

(10) Patent No.: US 11,533,221 B2
(45) Date of Patent: Dec. 20, 2022

(54) ARBITRATION METHOD AND RELATED APPARATUS

(71) Applicant: Huawei Technologies Co., Ltd., Shenzhen (CN)

(72) Inventors: Yunzhou Zheng, Shenzhen (CN); Shubing Zhang, Dongguan (CN); Shibin Liu, Xi'an (CN); Zexu Huang, Dongguan (CN); Ridong Xu, Dongguan (CN); Kaiyao Huang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/103,177

(22) Filed: Nov. 24, 2020

(65) Prior Publication Data

US 2021/0083928 A1    Mar. 18, 2021

Related U.S. Application Data

(63) Continuation of application No. PCT/CN2019/087670, filed on May 20, 2019.

(30) Foreign Application Priority Data

May 25, 2018  (CN) .......................... 201810515779.9

(51) Int. Cl.
*H04L 41/0668*    (2022.01)
*H04L 41/0659*    (2022.01)
(Continued)

(52) U.S. Cl.
CPC ...... *H04L 41/0668* (2013.01); *H04L 41/0659* (2013.01); *H04L 43/0811* (2013.01); *H04L 43/10* (2013.01); *H04L 67/1095* (2013.01)

(58) Field of Classification Search
CPC . H04L 43/0811; H04L 41/0663; H04L 43/16; H04L 65/80; H04L 67/145
See application file for complete search history.

(56) References Cited

U.S. PATENT DOCUMENTS 5,699,510 A    12/1997  Petersen et al.
9,348,715 B2 *  5/2016  Wilson ................ G06F 11/3055
(Continued)

FOREIGN PATENT DOCUMENTS

CN    103607310 A    2/2014
CN    104717077 A    6/2015
(Continued)

OTHER PUBLICATIONS

Glass, G. et al., "Logical Synchronous Replication in the Tintri VMstore File System", Proceedings of the 16th USENIX Conference on File and Storage Technologies, XP061025326, Feb. 12-15, 2018, Oakland, CA, US, total 14 pages.
(Continued)

*Primary Examiner* — Backhean Tiv
*Assistant Examiner* — Linh T. Nguyen
(74) *Attorney, Agent, or Firm* — Slater Matsil, LLP

(57) ABSTRACT

This application discloses an arbitration method and a related apparatus. The method includes: detecting, by the first ABS apparatus, first status information of a service module in the first DC; when determining that a communication link between the first DC and the second DC is faulty, obtaining, by the first ABS apparatus, second status information, wherein the second status information is status information that is of a service module in the second DC and that is detected by the second ABS apparatus; and arbitrating, by the first ABS apparatus, a subsequent service providing capability of the first DC based on the first status information and the second status information.

15 Claims, 12 Drawing Sheets

(51) Int. Cl.
*H04L 43/0811* (2022.01)
*H04L 43/10* (2022.01)
*H04L 67/1095* (2022.01)

(56) References Cited

U.S. PATENT DOCUMENTS

| | | | |
|---|---|---|---|
| 9,692,820 B2* | 6/2017 | Chaudhary | H04L 67/1025 |
| 2007/0233980 A1* | 10/2007 | Cox | G06F 11/2058 |
| | | | 711/162 |
| 2009/0063893 A1* | 3/2009 | Bagepalli | H04L 63/166 |
| | | | 714/4.1 |
| 2011/0246597 A1 | 10/2011 | Swanson et al. | |
| 2014/0173330 A1* | 6/2014 | Samanta | G06F 11/1675 |
| | | | 714/4.11 |
| 2015/0339200 A1* | 11/2015 | Madduri | G06F 11/1425 |
| | | | 714/4.11 |
| 2016/0085642 A1* | 3/2016 | Ferranti | G05B 23/0208 |
| | | | 714/4.11 |
| 2016/0210209 A1* | 7/2016 | Verkaik | G06F 11/2033 |
| 2017/0270015 A1 | 9/2017 | Chen et al. | |
| 2017/0288953 A1* | 10/2017 | Liu | H04L 12/18 |
| 2018/0077007 A1* | 3/2018 | Olson | G06F 11/2097 |
| 2018/0239651 A1* | 8/2018 | Gong | G06F 11/3423 |
| 2019/0278673 A1* | 9/2019 | Chandrashekar | G06F 11/2025 |

FOREIGN PATENT DOCUMENTS

| | | | | |
|---|---|---|---|---|
| CN | 105700940 A | | 6/2016 | |
| CN | 107918570 A | | 4/2018 | |
| CN | 3319258 A1 | * | 5/2018 | G06F 11/20 |
| EP | 3217627 A1 | | 9/2017 | |
| EP | 3285168 A1 | | 2/2018 | |
| EP | 3319258 A1 | | 5/2018 | |
| WO | 2018028219 A1 | | 2/2018 | |

OTHER PUBLICATIONS

ETSI GS NFV 002 V1.1.1 (Oct. 2013), "Network Functions Virtualisation(NFV); Architectural Framework", Sophia Antipolis Cedex, France, Oct. 2013, 21 pages.

* cited by examiner

ARBITRATION METHOD AND RELATED APPARATUS

CROSS-REFERENCE TO RELATED APPLICATIONS

This application is a continuation of International Application No. PCT/CN2019/087670, filed on May 20, 2019, which claims priority to Chinese Patent Application No. 201810515779.9, filed on May 25, 2018. The disclosures of the aforementioned applications are hereby incorporated by reference in their entireties.

TECHNICAL FIELD

This application relates to the field of communications technologies, and in particular, to an arbitration method and a related apparatus.

BACKGROUND

For a purpose of disaster recovery, generally, at least two data centers are established. One data center bears a user service, and the other data center backs up data, a configuration, a service, and the like. When one data center is faulty, the other data center continues to bear the user service. For example, as shown in FIG. 1, a data center 1 and a dater center 2 both include service modules 1 to 4. The service modules 1 to 4 respectively provide services 1 to 4. The services 1 to 4 are different services. In the data center 1, the service module 1 and the service module 2 are active service modules, and the service module 3 and the service module 4 are standby service modules. In the data center 2, the service module 3 and the service module 4 are active service modules, and the service module 1 and the service module 2 are standby service modules. The active service module is run to provide a service. When the active service module is faulty, the standby service module is upgraded to an active service module to continue to provide a service. For example, if the service module 1 in the data center 1 is faulty, the service module 1 in the data center 2 is upgraded to an active service module, so that the service module 1 in the data center 2 provides the service 1.

When a communication link between the two data centers is faulty, a network between the two data centers is disconnected. Because the service modules in the two data centers may need to communicate with each other, all services need to be borne by one data center. For example, if a network between a data center 1 and a data center 2 in FIG. 2 is disconnected, a service module 3 and a service module 4 in the data center 1 may be upgraded to active service modules, and a service module 3 and a service module 4 in the data center 2 are degraded to standby service modules. Service modules 1 to 4 in the data center 1 are all active service modules. The data center 1 provides all services.

In the prior art, when the communication link between two data centers is faulty, the services are fixedly provided by one data center. Therefore, in the prior art, a proper data center cannot be flexibly selected to provide services.

SUMMARY

Embodiments of this application provide an arbitration method and a related apparatus, to flexibly determine a proper data center through arbitration to provide a service when a communication link between two data centers is faulty.

According to a first aspect, this application provides an arbitration method. The arbitration method is applied to a first ABS apparatus. The first ABS apparatus is located in a first DC. The first DC is connected to a second DC. The second DC includes a second ABS apparatus. The method includes: detecting, by the first ABS apparatus, first status information of a service module in the first DC; when determining that a communication link between the first DC and the second DC is faulty, obtaining, by the first ABS apparatus, second status information, where the second status information is status information that is of a service module in the second DC and that is detected by the second ABS apparatus; and arbitrating, by the first ABS apparatus, a subsequent service providing capability of the first DC based on the first status information and the second status information.

It can be learned that the DC that subsequently provides a service can be determined based on actual statuses of the service modules in the first DC and the second DC by implementing the method described in the first aspect. In this way, a proper DC can be flexibly determined to provide a subsequent service.

Optionally, every two of the first DC, the second DC, and a third DC are connected to each other. The first DC further includes a first data synchronization module, the second DC includes a second data synchronization module, and the third DC includes a third data synchronization module. Data synchronization is implemented among the first data synchronization module, the second data synchronization module, and the third data synchronization module. The first ABS apparatus may further store the first status information in the first data synchronization module. Correspondingly, a specific implementation in which the first ABS apparatus obtains the second status information is that the first ABS apparatus reads the second status information from the first data synchronization module. The second status information is stored in the second data synchronization module by the second ABS apparatus, and is synchronized to the first data synchronization module by using the third data synchronization module.

It can be learned that, when this optional implementation is implemented, because data synchronization can be implemented among the first data synchronization module, the second data synchronization module, and the third data synchronization module, the first ABS apparatus can read the second status information from the first data synchronization module even if the communication link between the first DC and the second DC is faulty.

Optionally, the first ABS apparatus may further perform the following steps: detecting, by the first ABS apparatus, a first network connection status between the first DC and the second DC, and storing the first network connection status in the first data synchronization module; reading, by the first ABS apparatus, a second network connection status from the first data synchronization module, where the second network connection status is a network connection status that is between the first DC and the second DC and that is detected by the second ABS apparatus, and the second network connection status is stored in the second data synchronization module by the second ABS apparatus, and is synchronized to the first data synchronization module by using the third data synchronization module; and if both the first network connection status and the second network connection status are disconnected states, determining, by the first ABS apparatus, that the communication link between the first DC and the second DC is faulty.

Network disconnection may include two cases: In one case, the communication link between the first DC and the second DC is faulty; or in the other case, a DC is entirely faulty. If the first DC or the second DC is not entirely faulty, and only the communication link between the first DC and the second DC is faulty, the first DC detects the first network connection status, and the second DC detects the second network connection status. The first DC may read the second network connection status from the first data synchronization module, and the second DC may read the first network connection status from the second data synchronization module. Both the first network connection status and the second network connection status are certainly the disconnected states. If the second DC is entirely faulty, the second DC does not detect the second network connection status, and therefore, the first DC cannot read the second network connection status from the first data synchronization module. Therefore, when this optional implementation is implemented, the first ABS apparatus can determine whether the network disconnection between the first DC and the second DC is caused because the communication link is faulty or because the DC is faulty. In this way, the first ABS apparatus can accurately determine whether the communication link between the first DC and the second DC is faulty.

Optionally, the first ABS apparatus is an active apparatus in a plurality of ABS apparatuses included in the first DC, and an ABS apparatus other than the active apparatus in the plurality of ABS apparatuses is a standby apparatus. Correspondingly, a specific implementation in which the first ABS apparatus detects the first network connection status between the first DC and the second DC is: when the first ABS apparatus detects the network disconnection between the first DC and the second DC, determining a detection apparatus queue, where the detection apparatus queue includes an active apparatus and at least one standby apparatus, and the detection apparatus queue is used to detect network connectivity to the second DC; and if the first ABS apparatus detects that detection results obtained after all apparatuses in the detection apparatus queue perform detection for a first preset quantity of times are all network disconnected, determining, by the first ABS apparatus, that the first network connection status between the first DC and the second DC is the disconnected state; or if the first ABS apparatus detects that a detection result of any apparatus in the detection apparatus queue is network connected when a quantity of detection times does not exceed a first preset quantity of times, determining, by the first ABS apparatus, that the first network connection status between the first DC and the second DC is a connected state.

When this optional implementation is implemented, the following case can be avoided: Due to intermittent network disconnection and a detection mistake caused by a single process (the first ABS apparatus), the network disconnection is determined by mistake. Therefore, it can be accurately determined that the network is indeed disconnected.

Optionally, the first status information and the second status information include at least one of a weight of a non-faulty service module, a quantity of non-faulty service modules, and a quantity of active service modules. The weight is used to indicate an importance degree of a service module.

When this optional implementation is implemented, the DC that subsequently provides a service can be determined based on actual statuses of the service modules in the DCs. In this way, a proper DC can be flexibly determined to provide a subsequent service.

Optionally, the first status information and the second status information include the weight of a non-faulty service module. A specific implementation in which the first ABS apparatus arbitrates the subsequent service providing capability of the first DC based on the first status information and the second status information is: if a sum of weights included in the first status information is greater than a sum of weights included in the second status information, determining through arbitration that the subsequent service providing capability of the first DC is that the first DC is capable of providing a service; or if a sum of weights included in the first status information is less than a sum of weights included in the second status information, determining through arbitration that the subsequent service providing capability of the first DC is that the first DC is not capable of providing a service.

The weight is used to indicate an importance degree of a service module. A higher weight indicates a higher importance degree of the service module and a more critical service provided by the service module. Therefore, when this optional implementation is implemented, the DC that is finally determined through arbitration to be used to provide a subsequent service can provide a critical service.

Optionally, the first status information and the second status information include the quantity of non-faulty service modules. A specific implementation in which the first ABS apparatus arbitrates the subsequent service providing capability of the first DC based on the first status information and the second status information is: if a quantity of non-faulty service modules that is included in the first status information is greater than a quantity of non-faulty service modules that is included in the second status information, determining through arbitration that the subsequent service providing capability of the first DC is that the first DC is capable of providing a service; or if a quantity of non-faulty service modules that is included in the first status information is less than a quantity of non-faulty service modules that is included in the second status information, determining through arbitration that the subsequent service providing capability of the first DC is that the first DC is not capable of providing a service.

When this optional implementation is implemented, it can be ensured that the DC that is finally determined through arbitration to be used to provide a subsequent service can provide more services.

Optionally, the first status information and the second status information include the quantity of active service modules. A specific implementation in which the first ABS apparatus arbitrates the subsequent service providing capability of the first DC based on the first status information and the second status information is: if a quantity of active service modules that is included in the first status information is greater than a quantity of active service modules that is included in the second status information, determining through arbitration that the subsequent service providing capability of the first DC is that the first DC is capable of providing a service; or if a quantity of active service modules that is included in the first status information is less than a quantity of active service modules that is included in the second status information, determining through arbitration that the subsequent service providing capability of the first DC is that the first DC is not capable of providing a service.

After it is determined through arbitration that the DC can provide a service, a standby service module is switched to an active service module. If the DC includes a relatively large quantity of active service modules, only a few standby service modules need to be switched to active service modules. Therefore, when the optional implementation is implemented, switching from a standby service module to an active service module can be reduced, which facilitates fast providing a service.

Optionally, if a quantity of times of determining the detection apparatus queue in a first preset time period reaches a second preset quantity of times, and active/standby switching of service modules is performed for a third preset quantity of times in a second preset time period, the first ABS apparatus increases heartbeat timeout duration of each service module.

In existing actual application, when network QoS is relatively poor, frequent active/standby switching of service modules may occur, which also affects a service module cluster. Frequent re-election occurs on member service modules in the cluster, thereby affecting system stability. Therefore, when the optional implementation is implemented, and relatively poor network quality and frequent active/standby switching of service modules are detected, the heartbeat timeout duration of each service module may be increased, to reduce switching frequency of the service module, thereby improving system stability.

Optionally, if the quantity of times of determining the detection apparatus queue in the first preset time period reaches the second preset quantity of times, and the active/standby switching of service modules is performed for the third preset quantity of times in the second preset time period, a specific implementation in which the first ABS apparatus increases the heartbeat timeout duration of each service module is: if the quantity of times of determining the detection apparatus queue in the first preset time period reaches the second preset quantity of times, obtaining, by the first ABS apparatus, a network QoS parameter; and if the network QoS parameter is greater than a preset threshold, and the active/standby switching of service modules is performed for the third preset quantity of times in the second preset time period, increasing, by the first ABS apparatus, the heartbeat timeout duration of each service module.

If the network QoS parameter is greater than the preset threshold, it indicates relatively poor network quality. It is detected that the quantity of times of determining the detection apparatus queue in the first preset time period reaches the second preset quantity of times. Then, the QoS parameter is obtained to determine whether network quality is reduced. In this way, it can be more accurately determined whether the network quality is relatively poor.

According to a second aspect, an ABS apparatus is provided. The ABS apparatus may perform the method in any one of the first aspect or the optional implementations of the first aspect. The function may be implemented by using hardware, or may be implemented by hardware executing corresponding software. The hardware or the software includes one or more units corresponding to the foregoing function. The unit may be software and/or hardware. Based on a same inventive concept, for problem-resolving principles and beneficial effects of the ABS apparatus, refer to the first aspect or the optional implementations of the first aspect and the beneficial effects. Details are not described again.

According to a third aspect, an ABS apparatus is provided. The ABS apparatus includes a processor, a memory, and a communications interface. The processor, the communications interface, and the memory are connected. Optionally, the communications interface may be a transceiver. The communications interface is configured to implement communication with another ABS apparatus. One or more programs are stored in the memory. The processor invokes the program stored in the memory to implement the solution in the first aspect or the optional implementations of the first aspect. For a problem-resolving implementation and beneficial effects of the ABS apparatus, refer to the first aspect or the optional implementation and beneficial effects. Details are not described again.

According to a fourth aspect, a computer program product is provided. When the computer program product is run on a computer, the computer is enabled to perform the method according to any one of the first aspect and the optional implementations of the first aspect.

According to a fifth aspect, a chip product of an ABS apparatus is provided, to perform the method in any one of the first aspect and the optional implementations of the first aspect.

According to a sixth aspect, a computer program storage medium is provided. The computer readable storage medium stores an instruction. When the instruction is run on a computer, the computer is enabled to perform the method according to any one of the first aspect and the optional implementations of the first aspect.

According to a seventh aspect, a system is provided. The system includes the second ABS apparatus and the ABS apparatus according to the third aspect.

DETAILED DESCRIPTION OF ILLUSTRATIVE EMBODIMENTS

The following further describes specific embodiments of this application in detail with reference to the accompanying drawings.

The embodiments of this application provide an arbitration method and a related apparatus, to flexibly determine a proper data center through arbitration to provide a service when a communication link between two data centers is faulty.

For better understanding of the embodiments of this application, the following describes a communications system in the embodiments of this application.

Figure 1:
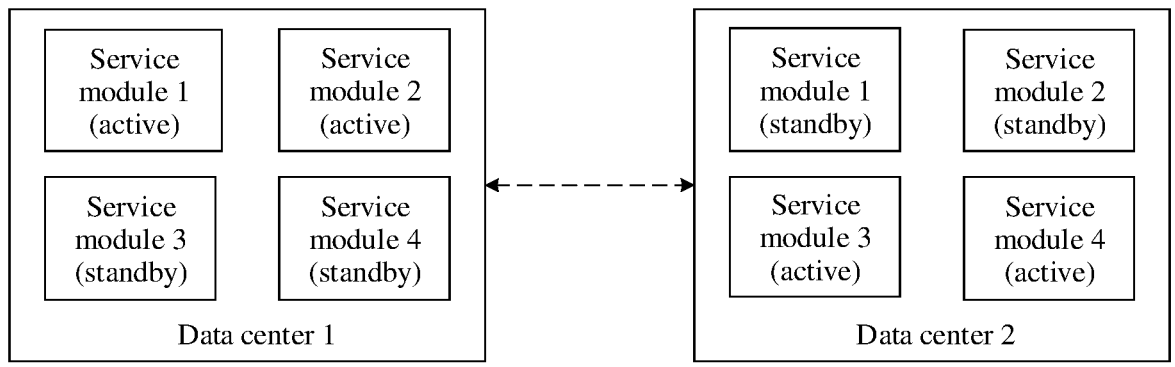
FIG. 1 and FIG. 2 are schematic structural diagrams of existing data centers.
Figure 2:
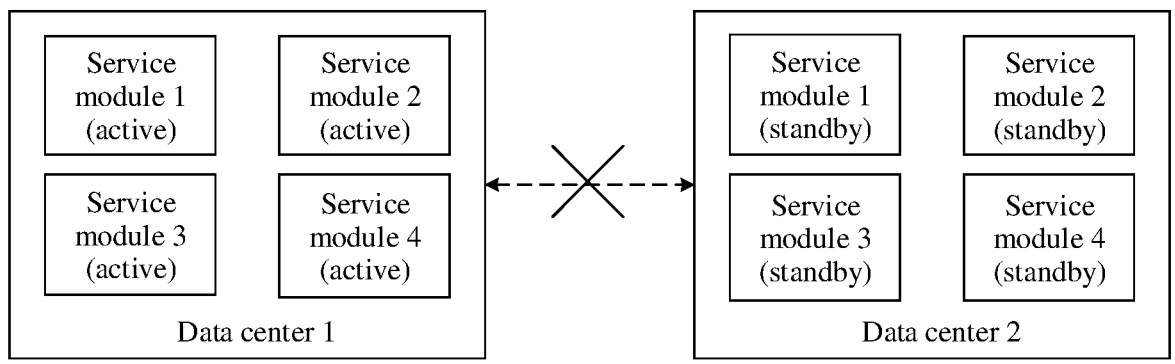
Figure 3:
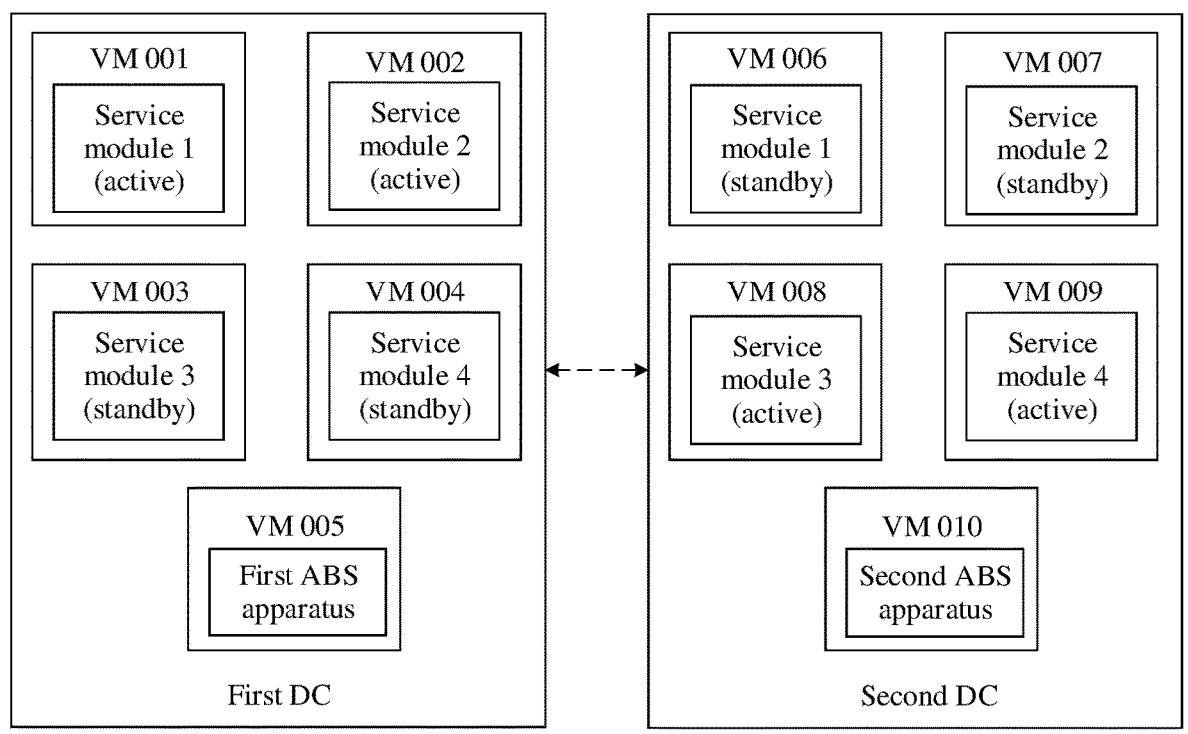
FIG. 3 is a schematic diagram of a communications system according to an embodiment of this application.

FIG. 3 is a schematic diagram of a communications system according to an embodiment of this application. As shown in FIG. 3, the communications system includes a first DC and a second DC. The first DC is connected to the second DC. The first DC includes a first arbitration service (ABS) apparatus, and the second DC includes a second ABS apparatus. The related DC in this embodiment of this application may be an availability zone (AZ).

The first DC may include only one ABS apparatus, or may include a plurality of ABS apparatuses. Different ABS apparatuses are deployed on different virtual machines (VM) or different physical machines. This is the same for the second DC. In FIG. 3, an example in which the first DC includes one first ABS apparatus and the first ABS apparatus is deployed on a virtual machine is used. If the first DC includes a plurality of ABS apparatuses, the first ABS apparatus is an active ABS apparatus in the plurality of ABS apparatuses in the first DC, and another ABS apparatus in the first DC is a standby ABS apparatus. Likewise, if the second DC includes a plurality of ABS apparatuses, the second ABS apparatus is an active ABS apparatus in the plurality of ABS apparatuses in the second DC, and another ABS apparatus in the second DC is a standby ABS apparatus. Optionally, the active ABS apparatus may be determined from the plurality of ABS apparatuses in the DC by using a Bully algorithm.

The active ABS apparatus of the first DC is configured to detect status information of a service module in the first DC. When detecting that a communication link between the first DC and the second DC is faulty, the active ABS apparatus of the first DC arbitrates a service providing capability of the first DC based on the status information that is of the service module and that is detected by the active ABS apparatus of the first DC and status information that is of a service module and that is detected by the active ABS apparatus of the second DC. Likewise, the active ABS apparatus of the second DC arbitrates a service providing capability of the second DC based on the status information that is of the service module and that is detected by the active ABS apparatus of the second DC and the status information that is of the service module and that is detected by the active ABS apparatus of the first DC. When the active ABS apparatus is faulty, one standby ABS apparatus is upgraded to an active ABS apparatus, and continues to provide an arbitration service. Therefore, a plurality of ABS apparatuses are deployed in one DC, which helps improve reliability of arbitration.

The first DC and the second DC may further include a plurality of service modules. The service module is a module that can provide a service. The service may be a teleservice, an e-commerce service, or the like. The service module and the ABS apparatus may be deployed on different virtual machines or different physical machines. The first DC and the second DC include same service modules. For example, as shown in FIG. 3, the first DC has service modules 1 to 6, and the second DC also has service modules 1 to 4. The service modules 1 to 4 are configured to provide services 1 to 4. The services 1 to 4 are different services. The service modules 1 and 2 in the first DC are active service modules, and the service modules 3 and 4 in the first DC are standby service modules. The service modules 3 and 4 in the second DC are active service modules, and the service modules 1 and 2 in the second DC are standby service modules. The standby service module is configured to be upgraded to an active service module to continue to provide a service for a user, when the active service module is faulty. For example, if the active service module 1 in the first DC is faulty, the service module 1 in the second DC is upgraded to an active service module. Alternatively, one DC may include a plurality of service modules that provide a same service. For example, the first DC may include two service modules 1, and the second DC may also include two service modules 1. Among the four service modules 1, only one service module 1 is an active service module, and the other service modules 1 are all standby service modules.

System architectures of the first DC and the second DC may be NFV architectures or other system architectures. This is not limited in this embodiment of this application. For example, when the service modules in the first DC and the second DC are configured to provide a teleservice, the system architectures of the first DC and the second DC may be NFV architectures. If the service modules in the first DC and the second DC are configured to provide another service, the system architectures of the first DC and the second DC may be other system architectures. When the service modules in the first DC and the second DC are configured to provide a teleservice, one set of NFV system may be deployed across the first DC and the second DC, or one set of NFV system is deployed in each of the first DC and the second DC.

Figure 4:
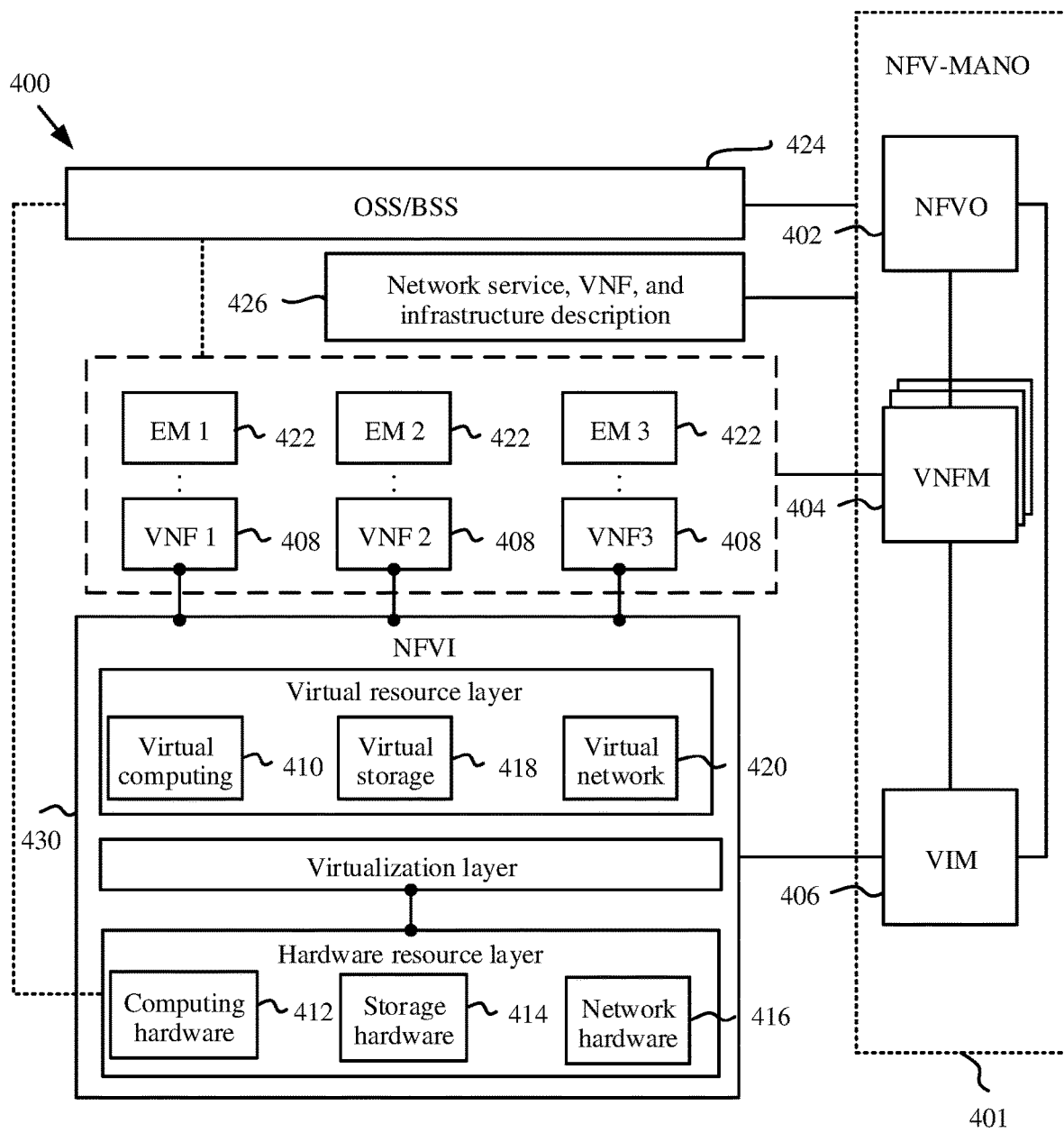
FIG. 4 is a schematic architectural diagram of an NFV system according to an embodiment of this application.

FIG. 4 is a schematic architectural diagram of an NFV system. The NFV system 400 may be used in various networks, for example, implemented in a data center network, an operator network, or a local area network. The NFV system 400 includes an NFV management and orchestration (NFV MANO) system 401, an NFV infrastructure (NFVI) layer 430, a plurality of virtualized network functions (VNF) 408, a plurality of element management (EM) 422, a network service, VNF, and infrastructure description (VNF and infrastructure description) 426, and an operation-support system/business support system (OSS/BSS) 424. The NFV management and orchestration system 401 includes an NFV orchestrator (NFVO) 402, one or more VNFMs (VNFM) 404, and a virtualized infrastructure manager (VIM) 406. The NFVI 430 includes computing hardware 412, storage hardware 414, network hardware 416, a virtualization layer, virtual computing 410, a virtual storage 418, and a virtual network 420. The network service, VNF, and infrastructure description 426 and the OSS/BSS 424 are further discussed in the ETSI GS NFV 002 V1.1.1 standard.

The NFV management and orchestration (NFV MANO) system 401 is used to monitor and manage the VNFs 408 and the NFVI 430. The NFVO 402 may implement network services (for example, L2 and L3 VPN services) on the NFVI 430; and may execute a resource-related request from the one or more VNFMs 404, send configuration information to the VNFM 404, and collect status information of the VNFs 408. In addition, the NFVO 402 may communicate with the VIM 406 to allocate and/or reserve a resource and exchange configuration and status information of a virtualized hardware resource. The VNFM 404 may manage the one or more VNFs 408. The VNFM 404 may execute various management functions, such as instantiating, updating, querying, scaling, and/or terminating the VNFs 408. The VIM 406 may perform resource management functions, such as a function of managing infrastructure resource allocation (for example, adding a resource to a virtual container) and operations (for example, collecting NFVI failure information). The VNFM 404 and the VIM 406 may communicate with each other to allocate a resource and exchange configuration and status information of a virtualized hardware resource.

The NFVI 430 includes a hardware resource, a software resource, or a combination thereof for deploying a virtualized environment. In other words, the hardware resource and the virtualization layer are used to provide virtualized resources, for example, by serving as a virtual machine and a virtual container in another form to be applied to the VNFs 408. The hardware resource includes the computing hardware 412, the storage hardware 414, and the network hardware 416. The computing hardware 412 may be existing hardware in the market and/or customized hardware and is configured to provide processing and computing resources. The storage hardware 414 may be a storage capacity provided in a network or a storage capacity (a local memory in a server) resident in the storage hardware 414. In an implementation solution, resources of the computing hardware 412 and the storage hardware 414 may be aggregated together. The network hardware 416 may be a switch, a router, and/or any other network device configured with a switching function. The network hardware 416 may cross a plurality of domains, and may include a plurality of networks formed by one or more interconnected transport networks.

The virtualization layer in the NFVI 430 can abstract the hardware resource from a physical layer and decouple the VNFs 408, to provide a virtualized resource to the VNFs 408. A virtual resource layer includes the virtual computing 410, the virtual storage 418, and the virtual network 420. The virtual computing 410 and the virtual storage 418 may be provided in a form of virtual machines and/or other virtual containers to the VNFs 408. For example, one or more VNFs 408 may be deployed on a virtual machine. The virtualization layer abstracts the network hardware 416 to form the virtual network 420. The virtual network 420 may include a virtual switch. The virtual switch is configured to provide a connection between one virtual machine and another virtual machine. In addition, the transport networks of the network hardware 416 may be virtualized by using a centralized control plane and a separate forwarding plane (for example, software-defined networking (SDN)).

As shown in FIG. 4, the VNFM 404 may interact with the VNFs 408 and the EM 422, to manage a life cycle of the VNF and exchange configuration and status information. The VNF 408 may be configured as virtualization of at least one network function executed by using a physical network device. For example, in an implementation solution, the VNF 408 may be configured to provide functions provided by different network elements in an IMS network, for example, network functions such as a P-SCSCF, an S-CSCF, or an HSS; and the EM 422 is configured to manage the one or more VNFs 108.

The following describes in detail the arbitration method and the related apparatus provided in this application.

Figure 5:
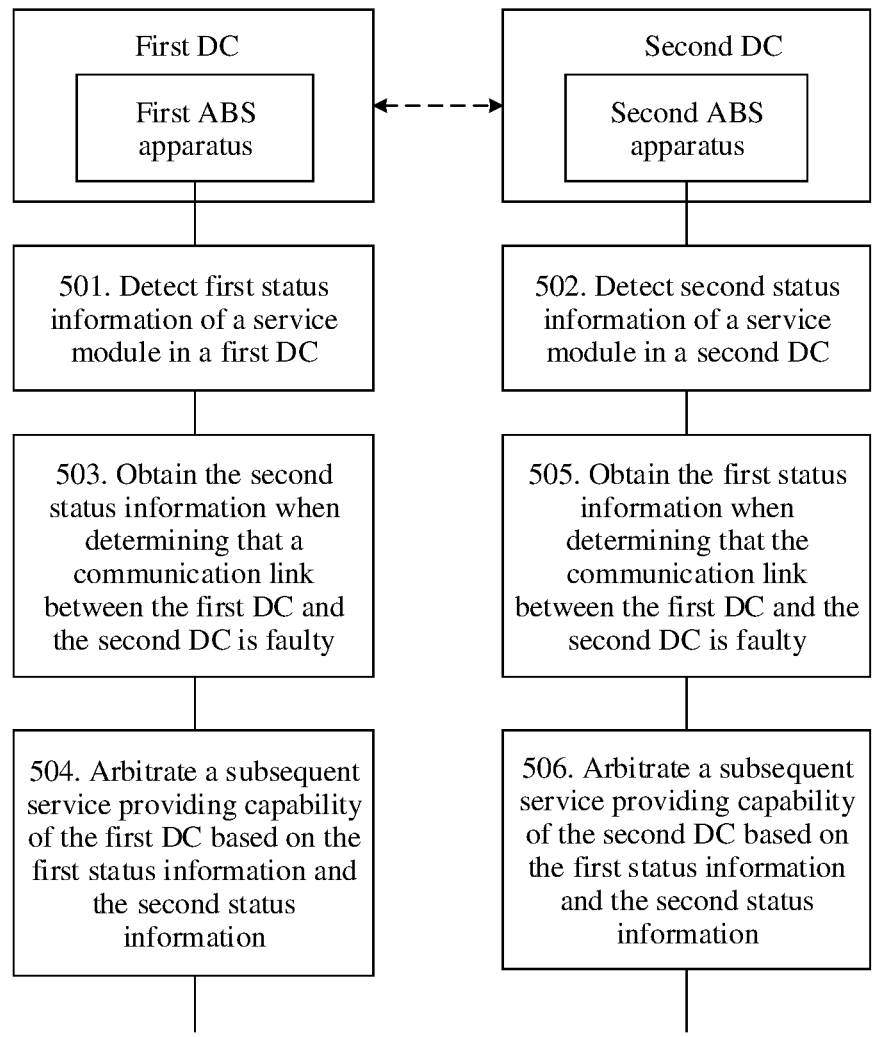
FIG. 5 is a schematic flowchart of an arbitration method according to an embodiment of this application.

FIG. 5 is a schematic flowchart of an arbitration method according to an embodiment of the present invention. As shown in FIG. 5, the arbitration method includes the following parts of 501 to 508.

501. A first ABS apparatus detects first status information of a service module in a first DC.

502. A second ABS apparatus detects second status information of a service module in a second DC.

Optionally, the first ABS apparatus may detect the first status information in a preset time period. Alternatively, the first ABS apparatus may detect the first status information when determining that a communication link between the first DC and the second DC is faulty.

Alternatively, the first ABS apparatus may first detect whether a network between the first DC and the second DC is connected. A reason for network disconnection may include two cases: In one case, the communication link between the first DC and the second DC is faulty; in the other case, a DC is entirely faulty. When determining that the network between the first DC and the second DC is disconnected, the first ABS apparatus further determines whether the communication link between the first DC and the second DC is faulty. Therefore, the first ABS apparatus may detect the first status information when determining that the network between the first DC and the second DC is faulty.

Likewise, the second ABS apparatus may detect the second status information in a preset time period. Alternatively, the second ABS apparatus may detect the second status information when determining that the communication link between the first DC and the second DC is faulty. Alternatively, the second ABS apparatus may detect the second status information when determining that the network between the first DC and the second DC is faulty.

503. The first ABS apparatus obtains the second status information when determining that the communication link between the first DC and the second DC is faulty.

504. The first ABS apparatus arbitrates a subsequent service providing capability of the first DC based on the first status information and the second status information.

505. The second ABS apparatus obtains the first status information when determining that the communication link between the first DC and the second DC is faulty.

Figure 8:
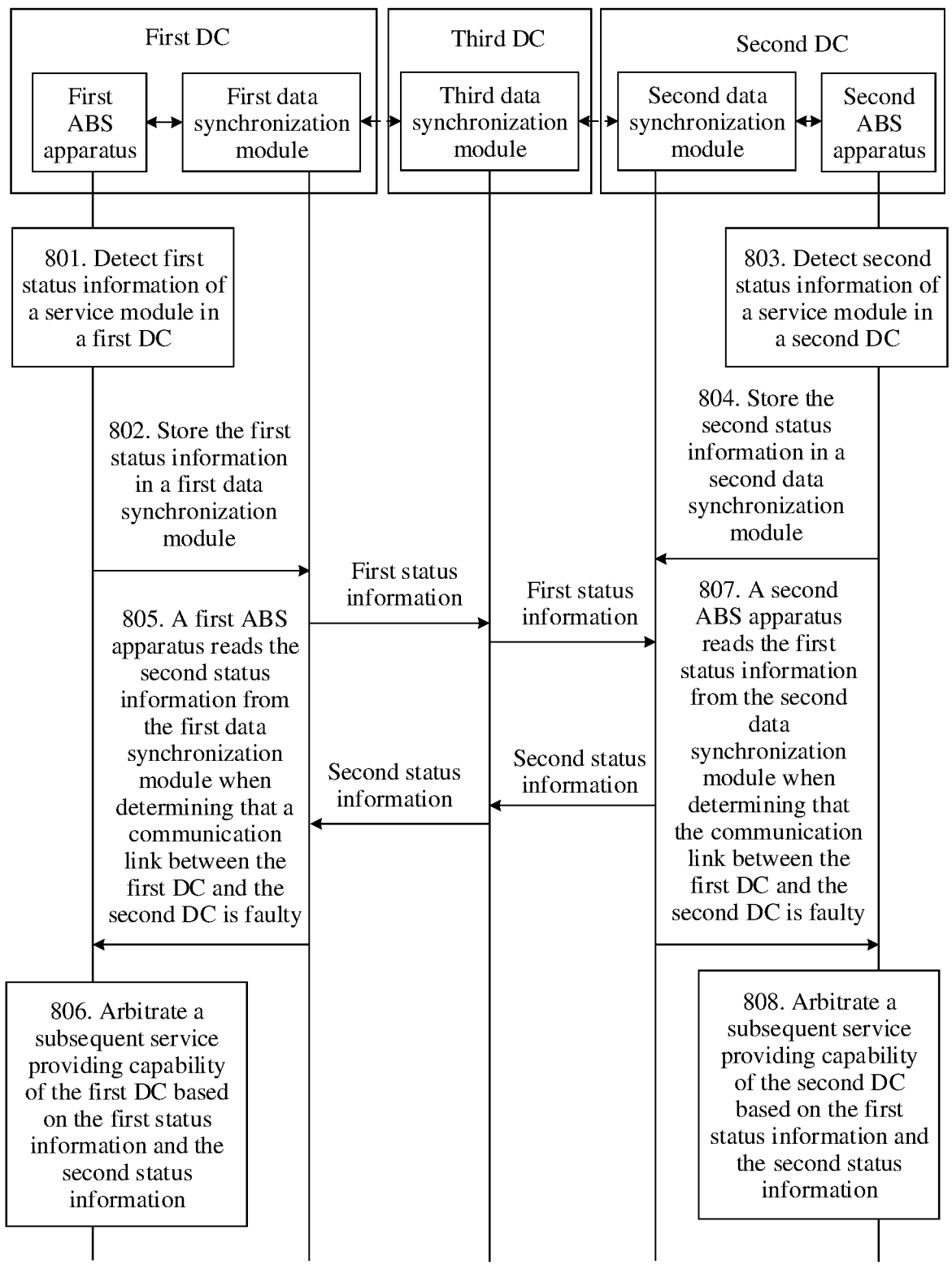
FIG. 8 is a schematic flowchart of another arbitration method according to an embodiment of this application.

Optionally, the first ABS apparatus may obtain the second status information by using the method described in FIG. 8, when determining that the communication link between the first DC and the second DC is faulty. The second ABS apparatus may obtain the first status information by using the method described in FIG. 8, when determining that the communication link between the first DC and the second DC is faulty.

Alternatively, the first ABS may obtain the second status information in the following manner when determining that the communication link between the first DC and the second DC is faulty, and the second ABS apparatus may obtain the first status information in the following manner when determining that the communication link between the first DC and the second DC is faulty:

The first ABS apparatus detects the first status information in the preset time period, and the second ABS apparatus also detects the second status information in the preset time period. After detecting the first status information, the first ABS apparatus sends the first status information to the second ABS apparatus. The second ABS apparatus caches the recently received first status information. After detecting the second status information, the second ABS apparatus sends the second status information to the first ABS apparatus. The first ABS apparatus caches the recently received second status information. When determining that the communication link between the first DC and the second DC is faulty, the first ABS apparatus obtains the cached second status information, and arbitrates the service providing capability of the first DC based on the first status information detected by the first ABS apparatus and the second status information. Likewise, when determining that the communication link between the first DC and the second DC is faulty, the second ABS apparatus obtains the cached first status information, and arbitrates a service providing capability of the second DC based on the second status information detected by the second ABS apparatus and the first status information.

The first ABS apparatus may alternatively obtain the second status information in another manner when determining that the communication link between the first DC and the second DC is faulty. The second ABS apparatus may alternatively obtain the first status information in another manner when determining that the communication link between the first DC and the second DC is faulty. This is not limited in this embodiment of this application.

506. The second ABS apparatus arbitrates the subsequent service providing capability of the second DC based on the first status information and the second status information.

Arbitrating the subsequent service providing capability of the DC is arbitrating whether the DC subsequently is capable of providing a service, that is, whether the DC can survive.

When an arbitration result of the first ABS apparatus is that the first DC subsequently is capable of providing a service, an arbitration result of the second ABS apparatus is that the second DC subsequently is not capable of providing a service. When an arbitration result of the first ABS apparatus is that the first DC subsequently is not capable of providing a service, an arbitration result of the second ABS apparatus is that the second DC subsequently is capable of providing a service. In other words, one DC of the first DC and the second DC provides a service, and the other DC does not provide a service.

When the arbitration result of the first ABS apparatus is that the first DC subsequently is capable of providing a service, and the arbitration result of the second ABS apparatus is that the second DC subsequently is not capable of providing a service, all active service modules in the second DC are degraded to standby service modules; and active service modules in the first DC remain unchanged, and standby service modules in the first DC are upgraded to active service modules. For example, as shown in FIG. 3, the service modules 1 and 2 in the first DC are active service modules, and the service modules 3 and 4 in the first DC are standby service modules. The service modules 3 and 4 in the second DC are active service modules, and the service modules 1 and 2 in the second DC are standby service modules. The service modules 3 and 4 in the second DC are degraded to standby service modules, and the service modules 3 and 4 in the first DC are upgraded to active service modules.

Likewise, when the arbitration result of the first ABS apparatus is that the first DC subsequently is not capable of providing a service, and the arbitration result of the second ABS apparatus is that the second DC subsequently is capable of providing a service, all active service modules in the first DC are degraded to standby service modules; and active service modules in the second DC remain unchanged, and standby service modules in the second DC are upgraded to active service modules.

Figure 6:
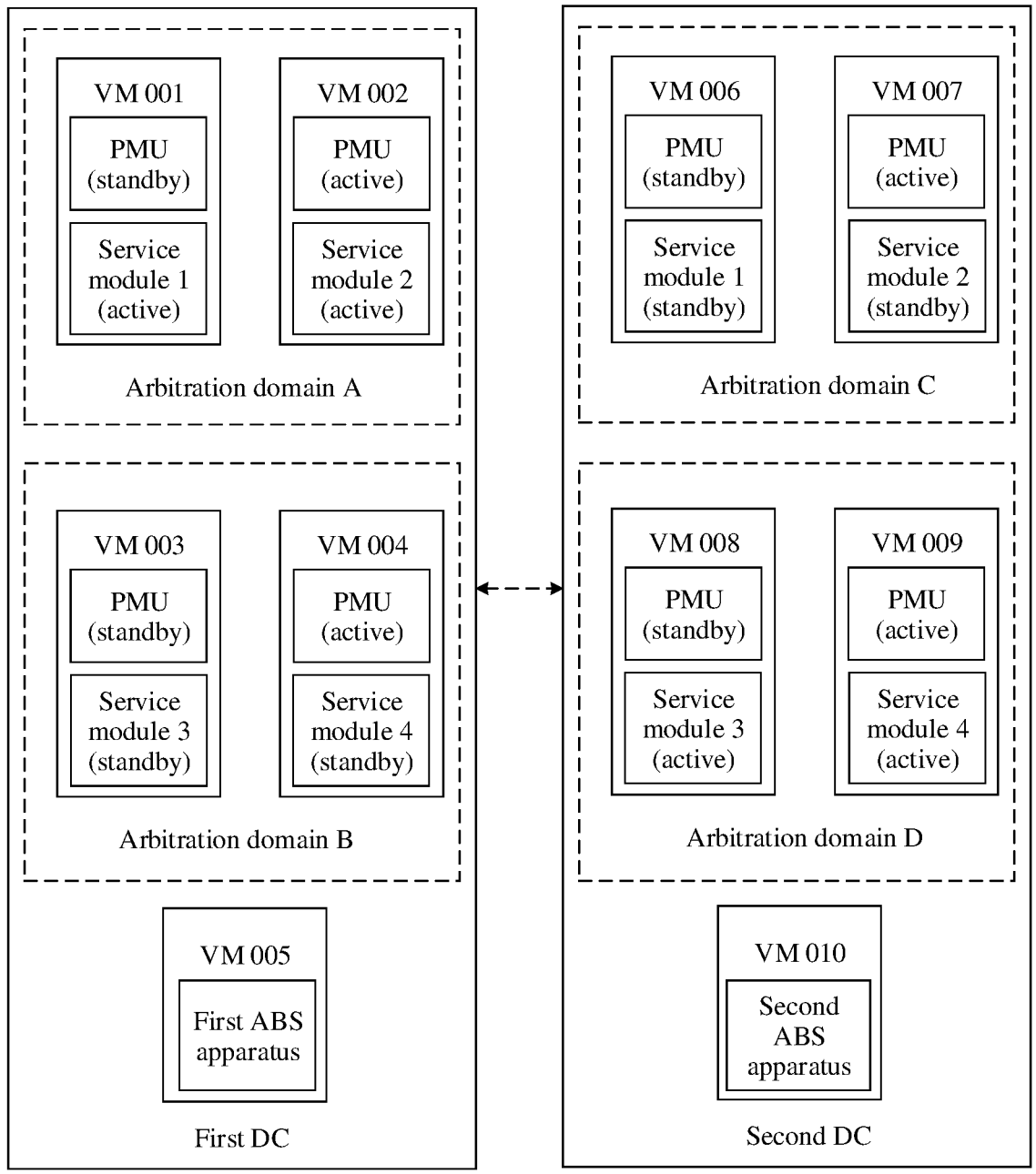
FIG. 6 is a schematic structural diagram of a data center according to an embodiment of this application.

Optionally, as shown in FIG. 6, if system architectures of the first DC and the second DC are NFV architectures, the first DC and the second DC may further include a platform management unit (platform management unit, PMU). Both the PMU and the service module belong to a unit of the VNF 408 shown in FIG. 4. In other words, the VNF 408 may include the PMU and the service module. An active PMU is configured to: when network disconnection does not occur between the first DC and the second DC but the service module in the first DC or the second DC is locally faulty, arbitrate service modules to determine which standby service module is upgraded to an active service module. The ABS apparatus is configured to: when network disconnection occurs, determine which DC can continue to provide a service. In other words, the arbitration is divided into two layers. A first layer is the ABS apparatus responsible for arbitration between DCs. A second layer is the PMU responsible for arbitration in a DC.

For example, when the network disconnection does not occur between the first DC and the second DC, the service module 1 in the active service modules in the first DC is faulty. An active PMU in an arbitration domain C in the second DC determines through arbitration that the service module 1 in the second DC is upgraded to an active service module. If the network disconnection occurs between the first DC and the second DC because the first DC is entirely faulty, the second ABS apparatus determines through arbitration that the second DC provides a subsequent service. If the network disconnection occurs between the first DC and the second DC because the communication link is faulty, the first ABS apparatus and the second ABS apparatus determine, through arbitration based on the first status information and the second status information, a DC that subsequently is capable of providing a service.

Hierarchical arbitration can achieve the following effects: 1. Development costs are reduced. An existing PMU arbitration solution can be used for arbitration in a DC. Arbitration between DCs is a newly introduced solution. Communication is performed by using an interface. The hierarchical arbitration can use the original solution as much as possible, to reduce the development costs. 2. A requirement for an arbitration speed in a DC and a requirement for an arbitration speed between DCs are both met although the two requirements are different. A network delay in a DC is relatively short, which requires a relatively high arbitration speed in a DC. A network delay between DCs is relatively long, which requires a relatively low arbitration speed between DCs. This problem can be well resolved through hierarchical arbitration.

In a possible implementation, the first status information and the second status information include at least one of a weight of a non-faulty service module, a quantity of non-faulty service modules, and a quantity of active service modules. The weight is used to indicate an importance degree of a service module. A higher weight indicates a higher importance degree of the service module. Alternatively, the quantity of non-faulty service modules in the first status information and the second status information may be replaced with an identifier of a non-faulty service module. When the ABS apparatus performs arbitration, the ABS apparatus first determines the quantity of non-faulty service modules based on a quantity of identifiers of the non-faulty service modules, and then performs arbitration based on the quantity of non-faulty service modules. Alternatively, the quantity of active service modules in the first status information and the second status information may be replaced with an identifier of an active service module. When the ABS apparatus performs arbitration, the ABS apparatus first determines the quantity of active service modules based on a quantity of identifiers of the active service modules, and then performs arbitration based on the quantity of active service modules. Alternatively, the first status information and the second status information may further include other information. This is not limited in this embodiment of this application.

When this possible implementation is implemented, the DC that subsequently provides a service can be determined based on actual statuses of the service modules in the DCs.

In this way, a proper DC can be flexibly determined to provide a subsequent service.

For example, as shown in FIG. 3, the first DC includes the service modules 1 to 4, and the second DC includes the service modules 1 to 4. Weights of the service modules 1 to 4 are respectively 10, 20, 30, and 40. The service modules 1 to 4 in the first DC are all not faulty. The service modules 1 and 4 in the second DC are faulty. Therefore, if the first status information includes the weight of a non-faulty service module in the first DC, the weight in the first status information is 100, that is, 10+20+30+40. If the second status information includes the weight of a non-faulty service module in the first DC, the weight in the second status information is 50, that is, 20+30.

If the first status information includes the quantity of non-faulty service modules, the quantity of non-faulty service modules in the first status information is 4. If the second status information includes the quantity of non-faulty service modules, the quantity of non-faulty service modules in the second status information is 2.

If the first status information includes the quantity of active service modules, the quantity of active service modules in the first status information is 2. If the second status information includes the quantity of active service modules, the quantity of active service modules in the second status information is 1.

Optionally, the first status information and the second status information include the weight of a non-faulty service module. A specific implementation of step 504 in which the first ABS apparatus arbitrates the subsequent service providing capability of the first DC based on the first status information and the second status information is: if a sum of weights included in the first status information is greater than a sum of weights included in the second status information, determining through arbitration that the subsequent service providing capability of the first DC is that the first DC is capable of providing a service; or if a sum of weights included in the first status information is less than a sum of weights included in the second status information, determining through arbitration that the subsequent service providing capability of the first DC is that the first DC is not capable of providing a service. An arbitration principle of the second ABS apparatus is the same as that of the first ABS apparatus. Details are not described herein again.

The weight is used to indicate an importance degree of a service module. A higher weight indicates a higher importance degree of the service module and a more critical service provided by the service module. Therefore, when this optional implementation is implemented, the DC that is finally determined through arbitration to be used to provide a subsequent service can provide a critical service.

For example, the weight in the first status information is 100, and the weight in the second status information is 50. In this case, the first ABS apparatus determines through arbitration that the subsequent service providing capability of the first DC is that the first DC is capable of providing a service, and the second ABS apparatus determines through arbitration that the subsequent service providing capability of the second DC is that the second DC cannot provide a service. Therefore, the first DC alone subsequently provides a service.

Optionally, the first status information and the second status information include the quantity of non-faulty service modules. A specific implementation of step 504 in which the first ABS apparatus arbitrates the subsequent service providing capability of the first DC based on the first status information and the second status information is: if a quantity of non-faulty service modules that is included in the first status information is greater than a quantity of non-faulty service modules included in the second status information, determining through arbitration that the service providing capability of the first DC is that the first DC is capable of providing a service; or if a quantity of non-faulty service modules that is included in the first status information is less than a quantity of non-faulty service modules that is included in the second status information, determining through arbitration that the service providing capability of the first DC is that the first DC is not capable of providing a service. An arbitration principle of the second ABS apparatus is the same as that of the first ABS apparatus. Details are not described herein again.

When this optional implementation is implemented, it can be ensured that the DC that is finally determined through arbitration to be used to provide a subsequent service can provide more services.

For example, the quantity of non-faulty service modules in the first status information is 4, and the quantity of non-faulty service modules in the second status information is 2. In this case, the first ABS apparatus determines through arbitration that the subsequent service providing capability of the first DC is that the first DC is capable of providing a service, and the second ABS apparatus determines through arbitration that the subsequent service providing capability of the second DC is that the second DC cannot provide a service. Therefore, the first DC alone subsequently provides a service.

Optionally, the first status information and the second status information include the quantity of active service modules. A specific implementation of step 504 in which the first ABS apparatus arbitrates the subsequent service providing capability of the first DC based on the first status information and the second status information is: if a quantity of active service modules that is included in the first status information is greater than a quantity of active service modules that is included in the second status information, determining through arbitration that the service providing capability of the first DC is that the first DC is capable of providing a service; or if a quantity of active service modules that is included in the first status information is less than a quantity of active service modules that is included in the second status information, determining through arbitration that the service providing capability of the first DC is that the first DC is not capable of providing a service. An arbitration principle of the second ABS apparatus is the same as that of the first ABS apparatus. Details are not described herein again.

After it is determined through arbitration that the DC can provide a service, a standby service module is switched to an active service module. If the DC includes a relatively large quantity of active service modules, only a few standby service modules need to be switched to active service modules. Therefore, when the optional implementation is implemented, switching from a standby service module to an active service module can be reduced, which facilitates fast providing a service.

For example, the quantity of active service modules in the first status information is 2, and the quantity of active service modules in the second status information is 1. In this case, the first ABS apparatus determines through arbitration that the subsequent service providing capability of the first DC is that the first DC is capable of providing a service, and the second ABS apparatus determines through arbitration that the subsequent service providing capability of the second DC is that the second DC cannot provide a service. Therefore, the first DC alone subsequently provides a service.

Optionally, when the first status information and the second status information include the weight of a non-faulty service module and the quantity of non-faulty service modules, the first ABS apparatus may first determine whether the weight of a non-faulty service module that is included in the first status information is greater than the weight of a non-faulty service module that is included in the second status information; and if a sum of weights included in the first status information is greater than a sum of weights included in the second status information, determine through arbitration that the subsequent service providing capability of the first DC is that the first DC is capable of providing a service; or if a sum of weights included in the first status information is less than a sum of weights included in the second status information, determine through arbitration that the subsequent service providing capability of the first DC is that the first DC is not capable of providing a service; or if a sum of weights included in the first status information is equal to a sum of weights included in the second status information, determine whether the quantity of non-faulty service modules that is included in the first status information is greater than the quantity of non-faulty service modules that is included in the second status information; and if the quantity of non-faulty service modules that is included in the first status information is greater than the quantity of non-faulty service modules that is included in the second status information, determine through arbitration that the service providing capability of the first DC is that the first DC is capable of providing a service; or if the quantity of non-faulty service modules that is included in the first status information is less than the quantity of non-faulty service modules that is included in the second status information, determine through arbitration that the service providing capability of the first DC is that the first DC is not capable of providing a service. An arbitration principle of the second ABS apparatus is the same as that of the first ABS apparatus. Details are not described herein again.

When this implementation is implemented, it can be preferentially ensured that the DC that is finally determined through arbitration to be used to provide a subsequent service can provide a critical service. When the first DC and the second DC have the same weight of a non-faulty service module, the subsequent service providing capability of the first DC is further arbitrated based on the quantities of non-faulty service modules of the first DC and the second DC, to ensure that the DC that is finally determined through arbitration to be used to provide a subsequent service can provide more services.

Optionally, when the first status information and the second status information include the weight of a non-faulty service module, the quantity of non-faulty service modules, and the quantity of active service modules, if a sum of weights included in the first status information is equal to a sum of weights included in the second status information, and a quantity of non-faulty service modules included in the first status information is equal to a quantity of non-faulty service modules included in the second status information, the first ABS apparatus determines whether a quantity of active service modules that is included in the first status information is greater than a quantity of active service modules that is included in the second status information; and if the quantity of active service modules that is included in the first status information is greater than the quantity of active service modules that is included in the second status information, determines through arbitration that the service providing capability of the first DC is that the first DC is capable of providing a service; or if the quantity of active service modules that is included in the first status information is less than the quantity of active service modules that is included in the second status information, determines through arbitration that the service providing capability of the first DC is that the first DC is not capable of providing a service. An arbitration principle of the second ABS apparatus is the same as that of the first ABS apparatus. Details are not described herein again.

When this implementation is implemented, it can be preferentially ensured that the DC that is finally determined through arbitration to be used to provide a subsequent service can provide a critical service. When the first DC and the second DC have the same weight of a non-faulty service module, the subsequent service providing capability of the first DC is further arbitrated based on the quantities of non-faulty service modules of the first DC and the second DC, to ensure that the DC that is finally determined through arbitration to be used to provide a subsequent service can provide more services. When the first DC and the second DC have the same quantity of non-faulty service modules, the subsequent service providing capability of the first DC is further arbitrated based on the quantities of active service modules of the first DC and the second DC, to ensure that the DC that is finally determined through arbitration to be used to provide a subsequent service can fast provide a service.

Optionally, if the sum of weights included in the first status information is equal to the sum of weights included in the second status information, the quantity of non-faulty service modules that is included in the first status information is equal to the quantity of non-faulty service modules that is included in the second status information, and the quantity of active service modules that is included in the first status information is equal to the quantity of active service modules that is included in the second status information, the first ABS apparatus determines whether an equipment room ID of the first DC is less than an equipment room ID of the second DC; and if the equipment room ID of the first DC is less than the equipment room ID of the second DC, determines through arbitration that the service providing capability of the first DC is that the first DC is capable of providing a service; or if the equipment room ID of the first DC is greater than the equipment room ID of the second DC, determines through arbitration that the service providing capability of the first DC is that the first DC is not capable of providing a service. An arbitration principle of the second ABS apparatus is the same as that of the first ABS apparatus. Details are not described herein again.

It can be learned that the DC that subsequently provides a service can be determined based on actual statuses of the service modules in the DCs by implementing the method described in FIG. 5. In this way, a proper DC can be flexibly determined to provide a subsequent service.

Figure 7:
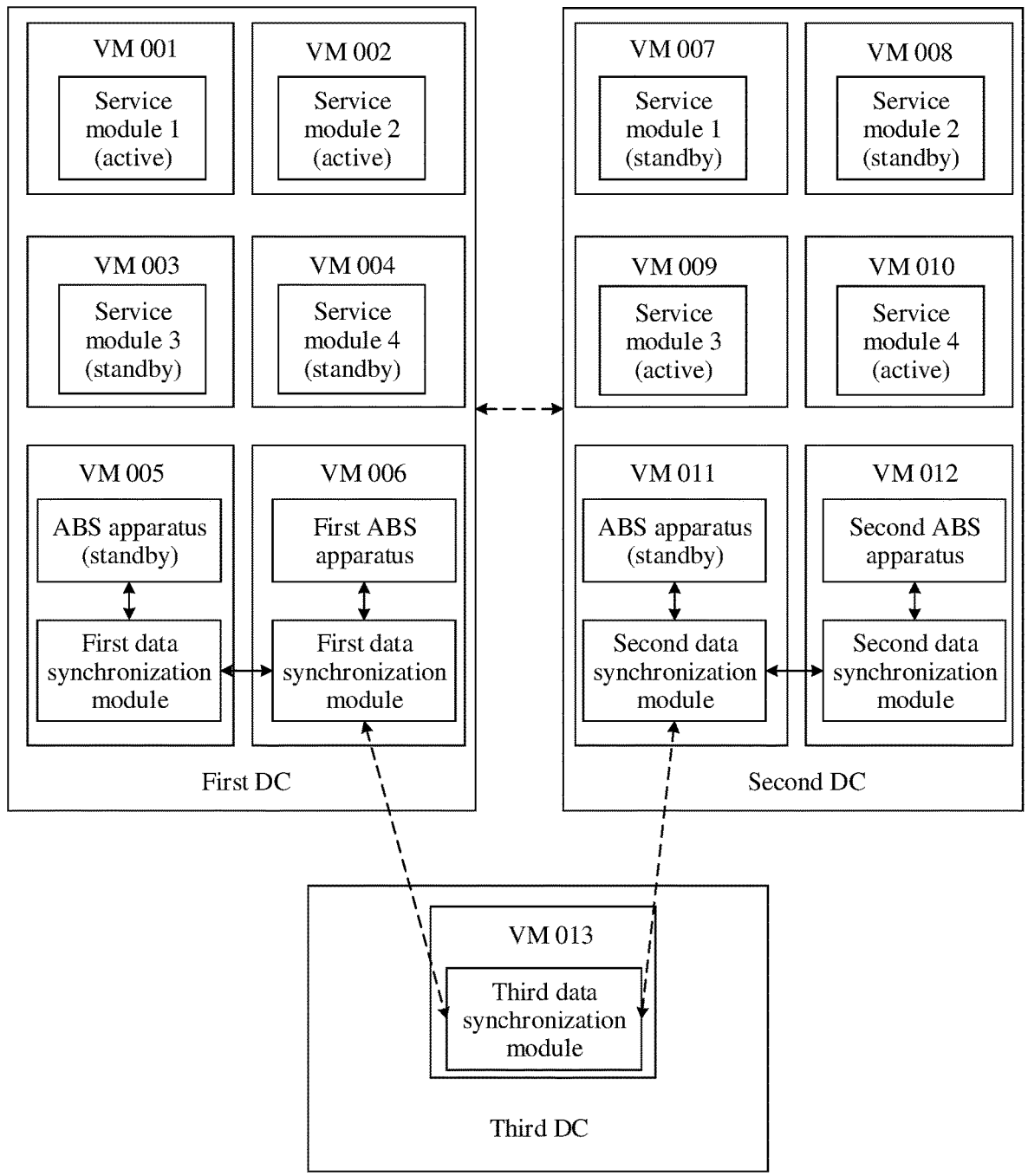
FIG. 7 is a schematic diagram of another communications system according to an embodiment of this application.

FIG. 7 is a schematic diagram of another communications system according to an embodiment of this application. A difference between the communications system shown in FIG. 7 and that shown in FIG. 3 is that the communications system in FIG. 7 further includes a third DC besides the first DC and the second DC shown in FIG. 3. The first DC further includes a first data synchronization module, the second DC includes a second data synchronization module, and the third DC includes a third data synchronization module. The first data synchronization module is connected to the third data synchronization module, and the second data synchronization module is connected to the third data synchronization module. Data synchronization can be implemented among the first data synchronization module, the second data synchronization module, and the third data synchronization module. Optionally, the first data synchronization module may be further connected to the second data synchronization module. In other words, every two of the first data synchronization module, the second data synchronization module, and the third data synchronization module are connected to each other.

The first DC includes only one ABS apparatus or a plurality of ABS apparatuses. This is the same for the second DC. FIG. 7 uses an example in which the first DC and the second DC include a plurality of ABS apparatuses and a first ABS apparatus and a second ABS apparatus are active ABS apparatuses.

Optionally, there may be one or more first data synchronization modules and one or more second data synchronization modules. The first data synchronization modules may communicate with each other and implement data synchronization. The second data synchronization modules may communicate with each other and implement data synchronization. For example, FIG. 7 uses an example in which the first DC includes a plurality of first data synchronization modules and the second DC includes a plurality of second data synchronization modules.

The first ABS apparatus may store detected first status information in the first data synchronization module. When a communication link between the first DC and the second DC is faulty, the first data synchronization module may synchronize the first status information to the third data synchronization module, and the third data synchronization module synchronizes the first status information to the second data synchronization module for storage. Likewise, the second ABS apparatus may store detected second status information to the second data synchronization module. The second data synchronization module may synchronize the second status information to the third data synchronization module for storage, and the third data synchronization module synchronizes the second status information to the first data synchronization module for storage. In other words, the first data synchronization module, the second data synchronization module, and the third data synchronization module store same data. Therefore, the first ABS apparatus can read the second status information from the first data synchronization module even if the communication link between the first DC and the second DC is faulty. The second ABS apparatus may also read the first status information from the second data synchronization module.

Optionally, the first data synchronization module, the second data synchronization module, and the third data synchronization module may be ETCDs or other modules that can perform data synchronization. This is not limited in this embodiment of this application.

Optionally, the ABS apparatus may be disposed on a same virtual machine or physical machine with the data synchronization module. FIG. 7 uses an example in which the ABS apparatus and the data synchronization module are disposed on a same virtual machine. Alternatively, the ABS apparatus and the synchronization module may be disposed on different virtual machines or different physical machines.

Based on the communications system shown in FIG. 7, FIG. 8 is a schematic flowchart of another arbitration method according to an embodiment of this application. FIG. 8 shows a specific implementation indicating how the first ABS apparatus obtains second status information and how the second ABS apparatus obtains first status information. As shown in FIG. 8, the arbitration method includes parts 801 to 808 in the following.

801. The first ABS apparatus detects first status information of a service module in the first DC.

802. The first ABS apparatus stores the first status information in the first data synchronization module.

803. The second ABS apparatus detects second status information of a service module in the second DC.

804. The second ABS apparatus stores the second status information in the second data synchronization module.

805. The first ABS apparatus reads the second status information from the first data synchronization module when determining that a communication link between the first DC and the second DC is faulty.

When the communication link between the first DC and the second DC is faulty, the second status information stored in the second data synchronization module by the second ABS apparatus may be synchronized to the first data synchronization module by using the third data synchronization module. Therefore, the second status information stored in the second data synchronization module by the second ABS apparatus may be read from the first data synchronization module.

806. The first ABS apparatus arbitrates a subsequent service providing capability of the first DC based on the first status information and the second status information.

807. The second ABS apparatus reads the first status information from the second data synchronization module when determining that the communication link between the first DC and the second DC is faulty.

When the communication link between the first DC and the second DC is faulty, the first status information stored in the first data synchronization module by the first ABS apparatus may be synchronized to the second data synchronization module by using the third data synchronization module. Therefore, the first status information stored in the first data synchronization module by the first ABS apparatus may be read from the second data synchronization module.

808. The second ABS apparatus arbitrates a subsequent service providing capability of the second DC based on the first status information and the second status information.

It can be learned that, when the method described in FIG. 8 is implemented, because data synchronization can be implemented among the first data synchronization module, the second data synchronization module, and the third data synchronization module, the first ABS apparatus can read the second status information from the first data synchronization module even if the communication link between the first DC and the second DC is faulty. The second ABS apparatus may also read the first status information from the second data synchronization module.

Figure 9A:
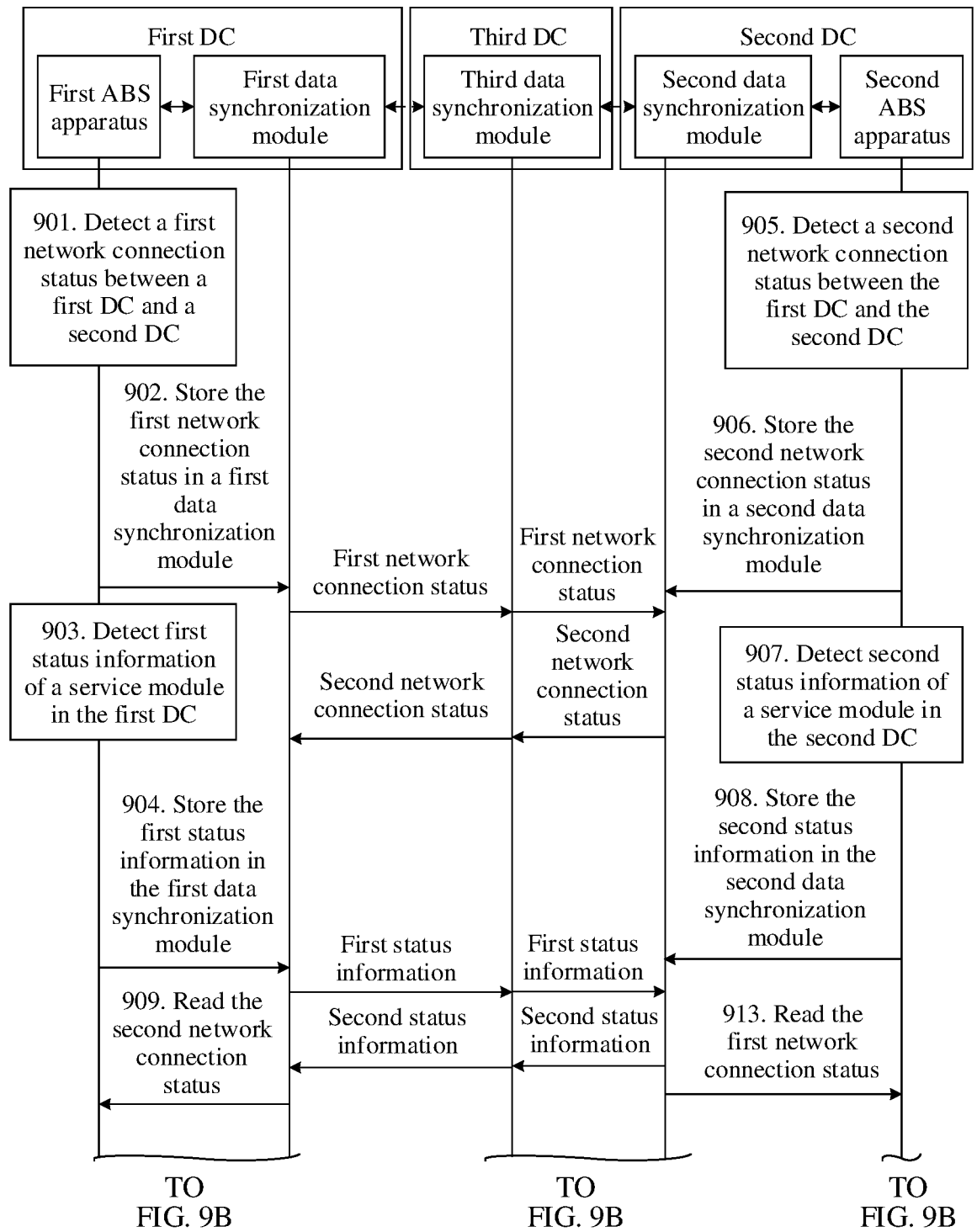
FIG. 9A and FIG. 9B are a schematic flowchart of still another arbitration method according to an embodiment of this application.
Figure 9B:
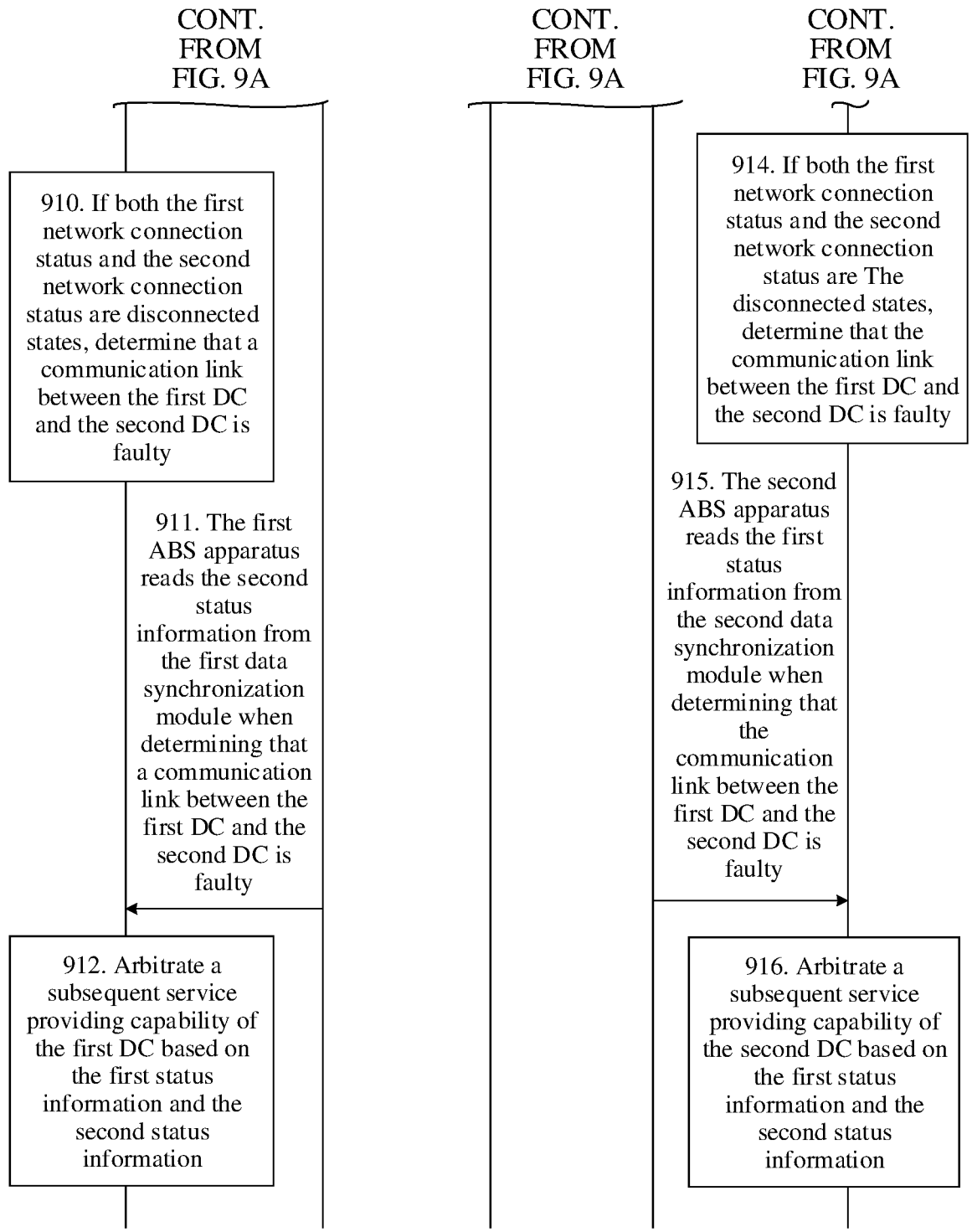

Based on the communications system shown in FIG. 7, FIG. 9A and FIG. 9B are a schematic flowchart of another arbitration method according to an embodiment of this application. FIG. 9A and FIG. 9B show a specific implementation indicating how the first ABS apparatus and the second ABS apparatus determine that the communication link between the first DC and the second DC is faulty. As shown in FIG. 9A and FIG. 9B, the arbitration method includes parts 901 to 916 in the following.

901. The first ABS apparatus detects a first network connection status between the first DC and the second DC.

The first network connection status is a network connection status from the first DC to the second DC.

902. The first ABS apparatus stores the first network connection status in the first data synchronization module.

903. The first ABS apparatus detects first status information of a service module in the first DC.

904. The first ABS apparatus stores the first status information in the first data synchronization module.

905. The second ABS apparatus detects a second network connection status between the first DC and the second DC.

The second network connection status is a network connection status from the second DC to the first DC.

906. The second ABS apparatus stores the second network connection status in the second data synchronization module.

907. The second ABS apparatus detects second status information of a service module in the second DC.

908. The second ABS apparatus stores the second status information in the second data synchronization module.

909. The first ABS apparatus reads the second network connection status from the first data synchronization module.

The second network connection status is stored in the second data synchronization module by the second ABS apparatus, and is synchronized to the first data synchronization module by using the third data synchronization module.

910. If both the first network connection status and the second network connection status are disconnected states, the first ABS apparatus determines that the communication link between the first DC and the second DC is faulty.

911. The first ABS apparatus reads the second status information from the first data synchronization module when determining that the communication link between the first DC and the second DC is faulty.

The second status information is stored in the second data synchronization module by the second ABS apparatus, and is synchronized to the first data synchronization module by using the third data synchronization module.

912. The first ABS apparatus arbitrates a subsequent service providing capability of the first DC based on the first status information and the second status information.

913. The second ABS apparatus reads the first network connection status from the second data synchronization module.

The first network connection status is stored in the first data synchronization module by the first ABS apparatus, and is synchronized to the second data synchronization module by using the third data synchronization module.

914. If both the first network connection status and the second network connection status are the disconnected states, the second ABS apparatus determines that the communication link between the first DC and the second DC is faulty.

915. The second ABS apparatus reads the first status information from the second data synchronization module when determining that the communication link between the first DC and the second DC is faulty.

The first status information is stored in the first data synchronization module by the first ABS apparatus, and is synchronized to the second data synchronization module by using the third data synchronization module.

916. The second ABS apparatus arbitrates a subsequent service providing capability of the second DC based on the first status information and the second status information.

Optionally, the first ABS apparatus may detect the first network connection status in a preset period. The second ABS apparatus may detect the second network connection status in a period. The network connection status may be a connected state or a disconnected state.

Optionally, the first ABS apparatus may read the second network connection status from the first data synchronization module in a preset period, and the second ABS apparatus may read the first network connection status from the second data synchronization module in the preset period. Alternatively, the first ABS apparatus may read the second network connection status from the first data synchronization module when detecting that the first network connection status is the disconnected state, and the second ABS apparatus may read the first network connection status from the second data synchronization module when detecting that the second network connection status is the disconnected state.

Optionally, the first ABS apparatus may detect the first status information in a preset time period. Alternatively, the first ABS apparatus may detect the first status information when determining that the communication link between the first DC and the second DC is faulty. Alternatively, the first ABS apparatus may detect the first status information when determining that the first network connection status is the disconnected state. This is also applied when the second ABS apparatus detects the second status information.

For example, the first ABS apparatus detects the first network connection status in a preset period of 5 milliseconds, and stores the first network connection status in the first data synchronization module. The second ABS apparatus detects the second network connection status in the preset period of 5 milliseconds, and stores the second network connection status in the second data synchronization module. The first ABS apparatus detects the first status information in a preset period of 6 milliseconds, and stores the first status information in the first data synchronization module. The second ABS apparatus detects the second status information in the preset period of 6 milliseconds, and stores the second status information in the second data synchronization module. The first ABS apparatus reads the recently stored second network connection status from the first data synchronization module in the preset period of 6 milliseconds, and the second ABS apparatus reads the recently stored first network connection status from the second data synchronization module in the preset period of 6 milliseconds.

If the first ABS apparatus determines that both the first network connection status and the second network connection status are the disconnected states, the first ABS apparatus determines that the communication link between the first DC and the second DC is faulty. The first ABS apparatus reads the recently stored second status information from the first data synchronization module when determining that the communication link between the first DC and the second DC is faulty. The first ABS apparatus arbitrates the subsequent service providing capability of the first DC based on the first status information and the second status information. If the second ABS apparatus determines that both the first network connection status and the second network connection status are the disconnected states, the second ABS apparatus determines that the communication link between the first DC and the second DC is faulty. The second ABS apparatus reads the recently stored first status information from the second data synchronization module when determining that the communication link between the first DC and the second DC is faulty. The second ABS apparatus arbitrates the subsequent service providing capability of the second DC based on the first status information and the second status information.

For example, the first ABS apparatus detects the first network connection status in a preset period of 5 milliseconds, and stores the first network connection status in the first data synchronization module. The second ABS apparatus detects the second network connection status in the preset period of 5 milliseconds, and stores the second network connection status in the second data synchronization module. The first ABS apparatus reads the recently stored second network connection status from the first data synchronization module when detecting that the first network connection status is the disconnected state. The second ABS apparatus reads the recently stored first network connection status from the second data synchronization module when detecting that the second network connection status is the disconnected state. If the first ABS apparatus determines that both the first network connection status and the second network connection status are the disconnected states, the first ABS apparatus determines that the communication link between the first DC and the second DC is faulty. The first ABS apparatus detects the first status information and stores the first status information in the first data synchronization module when the first ABS apparatus determines that the communication link between the first DC and the second DC is faulty. If the second ABS apparatus determines that both the first network connection status and the second network connection status are the disconnected states, the second ABS apparatus determines that the communication link between the first DC and the second DC is faulty. The second ABS apparatus detects the second status information and stores the second status information in the second data synchronization module when the second ABS apparatus determines that the communication link between the first DC and the second DC is faulty.

The first ABS apparatus reads the second status information from the first data synchronization module after storing the first status information in the first data synchronization module. The first ABS apparatus arbitrates the subsequent service providing capability of the first DC based on the first status information and the second status information. The second ABS apparatus reads the first status information from the second data synchronization module after storing the second status information in the second data synchronization module. The second ABS apparatus arbitrates the subsequent service providing capability of the second DC based on the first status information and the second status information.

Optionally, if the first ABS apparatus detects that the second status information does not exist in the first data synchronization module, the first ABS apparatus determines that the second DC is faulty, and the first ABS apparatus may determine through arbitration the first DC as a DC that subsequently is capable of providing a service. Therefore, a standby service module in the first DC is upgraded to an active service module. If the first status information and the second status information are detected in the preset time period and stored in the data synchronization modules, status information that is of a service module and that is stored in each of the first data synchronization module, the second data synchronization module, and the third data synchronization module has a survival period. If storage duration of the status information of the service module exceeds the survival period, the status information of the service module whose storage duration exceeds the survival period is deleted. Optionally, the survival period may be duration of one preset time period.

Network disconnection may include two cases: In one case, the communication link between the first DC and the second DC is faulty; in the other case, a DC is entirely faulty. If the first DC or the second DC is not entirely faulty, and only the communication link between the first DC and the second DC is faulty, the first DC detects the first network connection status, and the second DC detects the second network connection status. The first DC may read the second network connection status from the first data synchronization module, and the second DC may read the first network connection status from the second data synchronization module. Both the first network connection status and the second network connection status are certainly the disconnected states. If the second DC is entirely faulty, the second DC does not detect the second network connection status, and therefore, the first DC cannot read the second network connection status from the first data synchronization module. Therefore, when the method described in FIG. 9A and FIG. 9B is implemented, the first ABS apparatus can determine whether the network disconnection between the first DC and the second DC is caused because the communication link is faulty or because the DC is faulty. The first ABS apparatus can accurately determine whether the communication link between the first DC and the second DC is faulty.

In a possible implementation, the first ABS apparatus is an active apparatus in a plurality of ABS apparatuses included in the first DC, and an ABS apparatus other than the active apparatus in the plurality of ABS apparatuses is a standby apparatus. A specific implementation in which the first ABS apparatus detects the first network connection status between the first DC and the second DC is: when the first ABS apparatus detects the network disconnection between the first DC and the second DC, determining a detection apparatus queue, where the detection apparatus queue includes the first ABS apparatus and at least one standby apparatus, and the detection apparatus queue is used to detect network connectivity to the second DC; and if the first ABS apparatus detects that detection results obtained after all apparatuses in the detection apparatus queue perform detection for a first preset quantity of times are all network disconnected, determining, by the first ABS apparatus, that the first network connection status between the first DC and the second DC is the disconnected state; or if the first ABS apparatus detects that a detection result of any apparatus in the detection apparatus queue is network connected when a quantity of detection times does not exceed a first preset quantity of times, determining, by the first ABS apparatus, that the first network connection status between the first DC and the second DC is a connected state. This is also applied when the second ABS apparatus detects the second network connection status.

Figure 10:
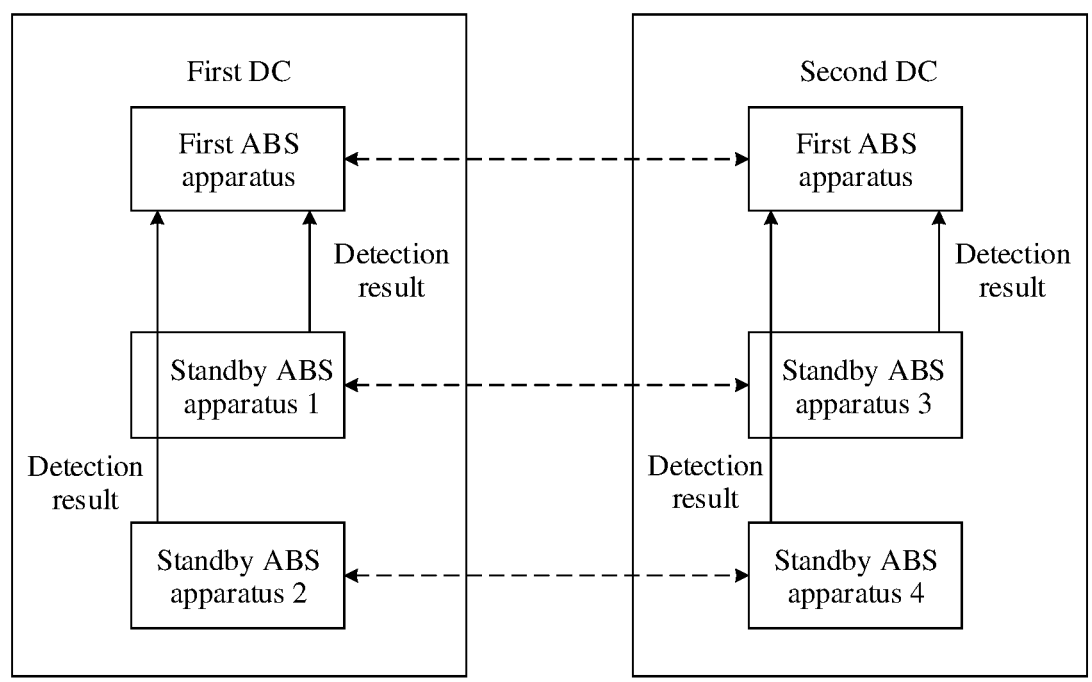
FIG. 10 is a schematic diagram in which a detection apparatus queue detects network connectivity according to an embodiment of this application.

For example, as shown in FIG. 10, the first ABS apparatus sends a sounding signal to the second ABS apparatus in a preset time period, to detect whether a network from the first DC to the second DC is connected. If the first ABS apparatus receives, in a preset time, feedback information sent by the second ABS apparatus, the first ABS apparatus determines that the network from the first DC to the second DC is connected. Otherwise, the first ABS apparatus determines that the network from the first DC to the second DC is disconnected. If the network is connected, the first ABS apparatus determines that the first network connection status is a connected state. If the network is disconnected, the first ABS apparatus determines the detection apparatus queue, to use the detection apparatus queue to further determine whether the network from the first DC to the second DC is connected. This is the same for the second ABS. As shown in FIG. 10, the detection apparatus queue determined by the first ABS apparatus includes the first ABS apparatus, a standby ABS apparatus 1, and a standby ABS apparatus 2. A detection apparatus queue determined by the second ABS apparatus includes the second ABS apparatus, a standby ABS apparatus 3, and a standby ABS apparatus 4. A quantity of ABS apparatuses included in the detection apparatus queue may be a preset quantity. A quantity of standby ABS apparatuses included in the detection apparatus queue may be randomly determined. As shown in FIG. 10, after the first ABS apparatus and the second ABS apparatus determine the detection apparatus queues, the first ABS apparatus sends a sounding signal to the second ABS apparatus, to detect whether the network from the first DC to the second DC is connected. The second ABS apparatus sends a sounding signal to the first ABS apparatus, to detect whether a network from the second DC to the first DC is connected. The standby ABS apparatus 1 sends a sounding signal to the standby ABS apparatus 3, to detect whether the network from the first DC to the second DC is connected. The standby ABS apparatus 3 sends a sounding signal to the standby ABS apparatus 1, to detect whether the network from the second DC to the first DC is connected. The standby ABS apparatus 2 sends a sounding signal to the standby ABS apparatus 4, to detect whether the network from the first DC to the second DC is connected. The standby ABS apparatus 4 sends a sounding signal to the standby ABS apparatus 2, to detect whether the network from the second DC to the first DC is connected. As shown in FIG. 10, the standby ABS apparatus sends a detection result to an active ABS apparatus in the DC in which the standby ABS apparatus is located.

If the first ABS apparatus detects for a first preset quantity of times: three times that the network is all disconnected, the standby ABS apparatus 1 detects for the first preset quantity of times: three times that the network is all disconnected, and the standby ABS apparatus 2 detects for the first preset quantity of times: three times that the network is all disconnected, the first ABS apparatus determines that the first network connection status from the first DC to the second DC is the disconnected state. If the second ABS apparatus detects for the first preset quantity of times: three times that the network is all disconnected, the standby ABS apparatus 3 detects for the first preset quantity of times: three times that the network is all disconnected, and the standby ABS apparatus 4 detects for the first preset quantity of times: three times that the network is all disconnected, the second ABS apparatus determines that the second network connection status from the second DC to the first DC is the disconnected state. Optionally, a time interval of detection performed by the detection apparatus queue is an increasing time interval.

If the first ABS apparatus, the standby ABS apparatus 1, or the standby ABS apparatus 2 detects at a first time of detection, a second time of detection, or a third time of detection that the network is connected, the first ABS apparatus determines that the first network connection status from the first DC to the second DC is a connected state. If the second ABS apparatus, the standby ABS apparatus 3, or the standby ABS apparatus 4 detects at a first time of detection, a second time of detection, or a third time of detection that the network is connected, the second ABS apparatus determines that the second network connection status from the second DC to the first DC is the connected state.

When this possible implementation is implemented, the following case can be avoided: Due to intermittent network disconnection and a detection mistake caused by a single process (the first ABS apparatus), the network disconnection is determined by mistake. Therefore, it can be accurately determined that the network is indeed disconnected.

In a possible implementation, if a quantity of times of determining the detection apparatus queue in a first preset time period reaches a second preset quantity of times, and active/standby switching of service modules is performed for a third preset quantity of times in a second preset time period, the first ABS apparatus increases heartbeat timeout duration of each service module. The first preset time period may be the same as or different from the second preset time period. The service module may be any service module.

The service module in the first DC may preset a time interval of periodically sending heartbeat information to the service module in the second DC. For example, heartbeat duration is 10 milliseconds, the active service module 1 in the first DC sends heartbeat information to the standby service module 1 in the second DC at intervals of 10 milliseconds. If the standby service module 1 in the second DC has not received the heartbeat information sent by the active service module 1 in the first DC in the heartbeat timeout duration: 15 milliseconds, the active service module 1 in the first DC is switched to a standby service module, and the standby service module 1 in the second DC is switched to an active service module. Therefore, shorter heartbeat timeout duration indicates that the active/standby switching of the service modules occurs more easily, and longer heartbeat timeout duration indicates that the active/standby switching of the service modules occurs more difficult.

It may be first detected whether the quantity of times of determining the detection apparatus queue in the first preset time period reaches the second preset quantity of times. If the quantity of times of determining the detection apparatus queue in the first preset time period reaches the second preset quantity of times, it is further detected whether the active/standby switching is performed on the service modules for a third preset quantity of times in a second preset time period. Alternatively, it may be first detected whether the active/standby switching is performed on the service modules for the third preset quantity of times in the second preset time period. If the active/standby switching is performed for the third preset quantity of times, it is further detected whether the quantity of times of determining the detection apparatus queue in the first preset time period reaches the second preset quantity of times. When the quantity of times of determining the detection apparatus queue in the first preset time period reaches the second preset quantity of times, it indicates relatively poor network quality. When the active/standby switching of the service modules is performed for the third preset quantity of times in the second preset time period, it indicates the frequent active/standby switching of the service modules.

In existing actual application, when network QoS is relatively poor, the frequent active/standby switching of the service modules may occur, which also affects a service module cluster. Frequent re-election occurs on member service modules in the cluster, thereby affecting system stability. Therefore, when the possible implementation is implemented, and relatively poor network quality and the frequent active/standby switching of the service modules are detected, the heartbeat timeout duration of each service module may be increased, to reduce switching frequency of the service module, thereby improving system stability.

Figure 11:
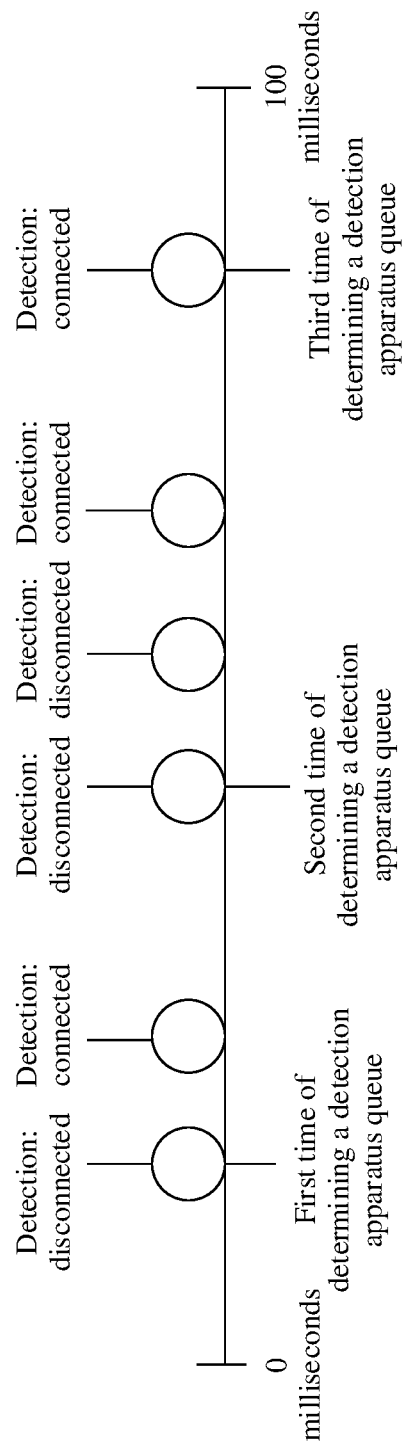
FIG. 11 is a schematic diagram in which a detection apparatus queue detects network connectivity according to an embodiment of this application.

For example, as shown in FIG. 11, the first ABS apparatus determines the detection apparatus queue for three times in a first preset time period: 100 milliseconds, to detect network connectivity. Two times of detection are performed after a first time of determining the detection apparatus queue. At least one ABS apparatus in the detection apparatus queue in a second time of detection detects that the network is connected. Three times of detection are performed after a second time of determining the detection apparatus queue.

At least one ABS apparatus in the detection apparatus queue in a third time of detection detects that the network is connected. One time of detection is performed after a third time of determining the detection apparatus queue. At least one ABS apparatus in the detection apparatus queue in this time of detection detects that the network is connected. Therefore, the first ABS apparatus determines the detection apparatus queue for three times in total. If the second preset quantity of times is 3, the first ABS apparatus detects whether the active/standby switching of the service modules is performed for the third preset quantity of times: five times in the second preset time period: 100 milliseconds. If the active/standby switching of the service modules is performed for the third preset quantity of times: five times, namely, the frequent active/standby switching of the service modules, the heartbeat timeout duration of each service module is increased to reduce switching frequency of the service module.

Optionally, it may be first detected whether the quantity of times of determining the detection apparatus queue in the preset time period reaches the second preset quantity of times. If the quantity of times of determining the detection apparatus queue in the preset time period reaches the second preset quantity of times, the first ABS apparatus obtains a network QoS parameter. If the network QoS parameter is greater than a preset threshold, and the first ABS apparatus determines that the active/standby switching of the service modules is performed for the third preset quantity of times in the second preset time period, the first ABS apparatus increases the heartbeat timeout duration of each service module. The network QoS parameter may be a packet loss rate, a delay, or the like. Before detecting whether the quantity of times of determining the detection apparatus queue in the preset time period reaches the second preset quantity of times, the first ABS apparatus may detect whether the active/standby switching of the service modules is performed for the third preset quantity of times in the second preset time period. Alternatively, when detecting that the network QoS parameter is greater than a preset threshold, the first ABS apparatus may detect whether the active/standby switching of the service modules is performed for the third preset quantity of times in a second preset time period.

If the network QoS parameter is greater than the preset threshold, it indicates relatively poor network quality. It is detected that the quantity of times of determining the detection apparatus queue in the first preset time period reaches the second preset quantity of times. Then, the QoS parameter is obtained to determine whether network quality is reduced. In this way, it can be more accurately determined whether the network quality is relatively poor.

Optionally, the first ABS apparatus may increase the heartbeat timeout duration of each service module based on a correspondence between the network QoS parameter and an increase amount of the heartbeat timeout duration. For example, a greater network QoS parameter may correspond to a greater increase amount. In this way, the heartbeat timeout duration can be flexibly increased. Certainly, the heartbeat timeout duration may be alternatively increased to a fixed value. This is not limited in this embodiment of this application.

Optionally, after the heartbeat duration of the service module is increased, when it is detected that the quantity of times of determining the detection apparatus queue in the preset time period is less than the second preset quantity of times, the heartbeat duration of the service module may be restored to a default value.

In this embodiment of the present invention, function module division may be performed on the device according to the foregoing method examples. For example, each function module can be divided for each function, or two or more functions can be integrated into one module. The integrated module may be implemented in a form of hardware, or may be implemented in a form of a software functional module. It should be noted that, in this embodiment of the present invention, module division is an example, and is merely logical function division. During actual implementation, another division manner may be used.

Figure 12:
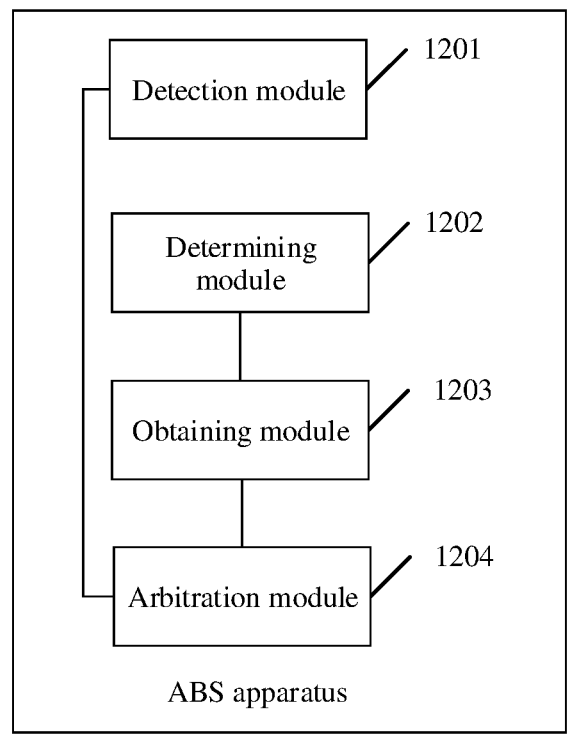
FIG. 12 is a schematic structural diagram of an ABS apparatus according to an embodiment of this application.

FIG. 12 shows an ABS apparatus according to an embodiment of the present invention. The ABS apparatus may be a computer program (including program code) run in a device, or may be a physical apparatus included in a device. The ABS apparatus is located in a first DC. The first DC is connected to a second DC. The second DC includes a second ABS apparatus. The ABS apparatus includes a detection module 1201, a determining module 1202, an obtaining module 1203, and an arbitration module 1204.

The detection module 1201 is configured to detect first status information of a service module in the first DC. The obtaining module 1203 is configured to: when the determining module 1202 determines that a communication link between the first DC and the second DC is faulty, obtain second status information, where the second status information is status information that is of a service module in the second DC and that is detected by the second ABS apparatus. The arbitration module 1204 is configured to arbitrate a subsequent service providing capability of the first DC based on the first status information and the second status information.

Optionally, the first DC further includes a first data synchronization module, + and the second DC includes a second data synchronization module. The first data synchronization module is connected to a third data synchronization module located in a third DC. The second data synchronization module is connected to the third data synchronization module. Data synchronization is implemented among the first data synchronization module, the second data synchronization module, and the third data synchronization module. The ABS apparatus further includes a storage module, configured to store the first status information in the first data synchronization module. A manner in which the obtaining module 1203 obtains the second status information is specifically: reading the second status information from the first data synchronization module, where the second status information is stored in the second data synchronization module by the second ABS apparatus, and is synchronized to the first data synchronization module by using the third data synchronization module.

Optionally, the detection module 1201 is further configured to detect a first network connection status between the first DC and the second DC; the storage module is further configured to store the first network connection status in the first data synchronization module; the obtaining module 1203 is further configured to read a second network connection status from the first data synchronization module, where the second network connection status is a network connection status that is between the first DC and the second DC and that is detected by the second ABS apparatus, and the second network connection status is stored in the second data synchronization module by the second ABS apparatus, and is synchronized to the first data synchronization module by using the third data synchronization module; and the determining module 1202 is configured to: if both the first network connection status and the second network connection status are disconnected states, determine that the communication link between the first DC and the second DC is faulty.

Optionally, the ABS apparatus is an active apparatus in a plurality of ABS apparatuses included in the first DC, and an ABS apparatus other than the active apparatus in the plurality of ABS apparatuses is a standby apparatus. A manner in which the detection module 1201 detects the first network connection status between the first DC and the second DC is specifically: when the detection module 1201 detects the network disconnection between the first DC and the second DC, determining a detection apparatus queue, where the detection apparatus queue includes an active apparatus and at least one standby apparatus, and the detection apparatus queue is used to detect network connectivity to the second DC; and if the detection module 1201 detects that detection results obtained after all apparatuses in the detection apparatus queue perform detection for a first preset quantity of times are all network disconnected, determining that the first network connection status between the first DC and the second DC is a disconnected state; or if the detection module 1201 detects that a detection result of any apparatus in the detection apparatus queue is network connected when a quantity of detection times does not exceed a first preset quantity of times, determining that the first network connection status between the first DC and the second DC is a connected state.

Optionally, the first status information and the second status information include at least one of a weight of a non-faulty service module, a quantity of non-faulty service modules, and a quantity of active service modules. The weight is used to indicate an importance degree of a service module.

Optionally, the first status information and the second status information include the weight of a non-faulty service module. A manner in which the arbitration module 1204 arbitrates the subsequent service providing capability of the first DC based on the first status information and the second status information is specifically: if a sum of weights included in the first status information is greater than a sum of weights included in the second status information, determining through arbitration that the subsequent service providing capability of the first DC is that the first DC is capable of providing a service; or if a sum of weights included in the first status information is less than a sum of weights included in the second status information, determining through arbitration that the subsequent service providing capability of the first DC is that the first DC is not capable of providing a service.

Optionally, the first status information and the second status information include the quantity of non-faulty service modules. A manner in which the arbitration module 1204 arbitrates the subsequent service providing capability of the first DC based on the first status information and the second status information is specifically: if a quantity of non-faulty service modules that is included in the first status information is greater than a quantity of non-faulty service modules that is included in the second status information, determining through arbitration that the subsequent service providing capability of the first DC is that the first DC is capable of providing a service; or if a quantity of service modules that is included in the first status information is less than a quantity of service modules that is included in the second status information, determining through arbitration that the subsequent service providing capability of the first DC is that the first DC is not capable of providing a service.

Optionally, the first status information and the second status information include the quantity of active service modules. A manner in which the arbitration module 1204 arbitrates the subsequent service providing capability of the first DC based on the first status information and the second status information is specifically: if a quantity of active service modules that is included in the first status information is greater than a quantity of active service modules that is included in the second status information, determining through arbitration that the subsequent service providing capability of the first DC is that the first DC is capable of providing a service; or if a quantity of active service modules that is included in the first status information is less than a quantity of active service modules that is included in the second status information, determining through arbitration that the subsequent service providing capability of the first DC is that the first DC is not capable of providing a service.

Optionally, the ABS apparatus further includes an adjustment module, configured to increase heartbeat timeout duration of each service module if a quantity of times of determining the detection apparatus queue in a first preset time period reaches a second preset quantity of times, and active/standby switching of service modules is performed for a third preset quantity of times in a second preset time period.

Optionally, the adjustment module is specifically configured to obtain a network QoS parameter if the quantity of times of determining the detection apparatus queue in the first preset time period reaches the second preset quantity of times; and increase heartbeat timeout duration of each service module if the network QoS parameter is greater than a preset threshold, and the active/standby switching of service modules is performed for the third preset quantity of times in the second preset time period.

Figure 13:
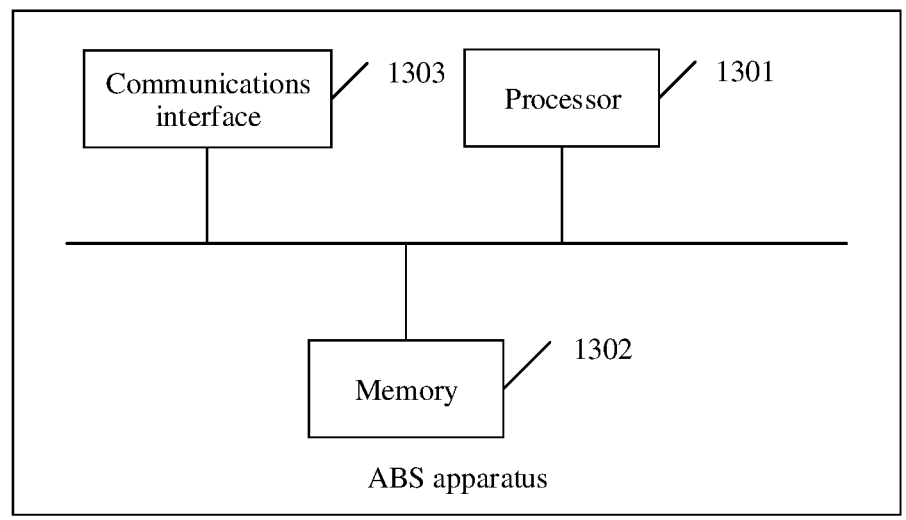
FIG. 13 is a schematic structural diagram of another ABS apparatus according to an embodiment of this application.

FIG. 13 is a schematic structural diagram of an ABS apparatus according to an embodiment of this application. As shown in FIG. 13, the ABS apparatus 1300 includes a processor 1301, a memory 1302, and a communications interface 1303. The processor 1301, the memory 1302, and the communications interface 1303 are connected.

The processor 1301 may be a central processing unit (CPU), a general-purpose processor, a coprocessor, a digital signal processor (DSP), an application-specific integrated circuit (ASIC), a field programmable gate array (FPGA) or another programmable logical device, a transistor logical device, a hardware component, or any combination thereof. Alternatively, the processor 1301 may be a combination of processors implementing a computing function, for example, a combination of one or more microprocessors or a combination of a DSP and a microprocessor.

The communications interface 1303 is configured to implement communication with another ABS apparatus.

The processor 1301 invokes program code stored in the memory 1302, to perform steps performed by the first ABS apparatus in the foregoing method embodiments.

Based on a same inventive concept, a problem-resolving principle of the apparatus provided in this embodiment of this application is similar to that of the method embodiments of this application. Therefore, for implementation of the apparatus, refer to the implementation of the methods. For brevity of description, details are not described herein again.

In the foregoing embodiments, the description of each embodiment has respective focuses. For a part that is not described in detail in an embodiment, refer to related descriptions in other embodiments.

Finally, it should be noted that the foregoing embodiments are merely intended for describing the technical solutions of this application other than limiting this application. Although this application is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of this application.

What is claimed is:

1. A method, comprising:
    detecting, by a first arbitration service (ABS) apparatus, first status information of a first service module of a first data center (DC), wherein the first ABS apparatus is located in the first DC, the first DC is connected to a second DC, and the second DC comprises a second ABS apparatus located in the second DC, and wherein the first DC further comprises a first data synchronization module, the second DC further comprises a second data synchronization module, the first data synchronization module is connected to a third data synchronization module in a third DC, the second data synchronization module is connected to the third data synchronization module, and data synchronization is implemented among the first data synchronization module, the second data synchronization module, and the third data synchronization module;
    storing, by the first ABS apparatus, the first status information in the first data synchronization module;
    when determining that a communication link between the first DC and the second DC is faulty, obtaining, by the first ABS apparatus, second status information, wherein the second status information is status information of a second service module in the second DC that is detected by the second ABS apparatus, and the second status information is stored in the first ABS apparatus, and wherein obtaining, by the first ABS apparatus, the second status information comprises:
        the first ABS apparatus reading the second status information from the first data synchronization module, wherein the second status information is stored in the second data synchronization module by the second ABS apparatus, and the second status information is synchronized to the first data synchronization module using the third data synchronization module; and
    arbitrating, by the first ABS apparatus, a subsequent service providing capability of the first DC based on the first status information and the second status information.

2. The method according to claim 1, further comprising:
    detecting, by the first ABS apparatus, a first network connection status of the communication link between the first DC and the second DC, and storing the first network connection status in the first data synchronization module;
    reading, by the first ABS apparatus, a second network connection status from the first data synchronization module, wherein the second network connection status is a network connection status of the communication link that is between the first DC and the second DC and is detected by the second ABS apparatus, and the second network connection status is stored in the second data synchronization module by the second ABS apparatus, and the second network connection status is synchronized to the first data synchronization module by using the third data synchronization module; and
    when both the first network connection status and the second network connection status are disconnected states, determining, by the first ABS apparatus, that the communication link between the first DC and the second DC is faulty.

3. The method according to claim 2, wherein the first ABS apparatus is an active apparatus in a plurality of ABS apparatuses comprised in the first DC, and at least one other ABS apparatus in the plurality of ABS apparatuses is a standby apparatus; and
    wherein detecting, by the first ABS apparatus, the first network connection status of the connection between the first DC and the second DC comprises:
        when detecting a network disconnection of the communication link between the first DC and the second DC, determining, by the first ABS apparatus, a detection apparatus queue, wherein the detection apparatus queue comprises the active apparatus and at least one standby apparatus, and the detection apparatus queue is usable to detect network connectivity to the second DC; and
    when the first ABS apparatus detects that detection results obtained after all apparatuses in the detection apparatus queue perform detection for a first preset quantity of times are all network disconnected, determining, by the first ABS apparatus, that the first network connection status of the communication link between the first DC and the second DC is a disconnected state; or
    when the first ABS apparatus detects that a detection result of any apparatus in the detection apparatus queue is network connected when a quantity of detection times does not exceed a first preset quantity of times, determining, by the first ABS apparatus, the first network connection status of the communication link between the first DC and the second DC is a connected state.

4. The method according to claim 3, further comprising:
    increasing, by the first ABS apparatus, a heartbeat timeout duration of each service module in the first ABS apparatus when a quantity of times of determining the detection apparatus queue in a first preset time period reaches a second preset quantity of times, and active/standby switching of service modules is performed for a third preset quantity of times in a second preset time period.

5. The method according to claim 4, wherein increasing, by the first ABS apparatus, the heartbeat timeout duration of each service module in the first ABS apparatus when the quantity of times of determining the detection apparatus queue in the first preset time period reaches a second preset quantity of times, and active/standby switching of the service modules is performed for a third preset quantity of times in the second preset time period comprises:
    obtaining, by the first ABS apparatus, a network QoS parameter when the quantity of times of determining the detection apparatus queue in the first preset time period reaches the second preset quantity of times; and
    increasing, by the first ABS apparatus, the heartbeat timeout duration of each service module when the network QoS parameter is greater than a preset threshold, and the active/standby switching of service modules is performed for the third preset quantity of times in the second preset time period.

6. The method according to claim 1, wherein the first status information and the second status information respectively comprise at least one of a weight of a non-faulty service module, a quantity of non-faulty service modules, or a quantity of active service modules; and
wherein a weight of a service module indicates an importance degree of the service module.

7. The method according to claim 1, wherein the first status information and the second status information respectively comprise at least one of a weight of a non-faulty service module, a quantity of non-faulty service modules, or a quantity of active service modules; and wherein arbitrating, by the first ABS apparatus, the subsequent service providing capability of the first DC based on the first status information and the second status information comprises:
when a sum of weights comprised in the first status information is greater than a sum of weights comprised in the second status information, determining through arbitration that the subsequent service providing capability of the first DC is that the first DC is capable of providing a service; or
when a sum of weights comprised in the first status information is less than a sum of weights comprised in the second status information, determining through arbitration that the subsequent service providing capability of the first DC is that the first DC is not capable of providing a service.

8. The method according to claim 1, wherein the first status information and the second status information respectively comprise a quantity of non-faulty service modules; and
wherein arbitrating, by the first ABS apparatus, the subsequent service providing capability of the first DC based on the first status information and the second status information comprises:
when the quantity of non-faulty service modules that is comprised in the first status information is greater than the quantity of non-faulty service modules that is comprised in the second status information, determining through arbitration that the subsequent service providing capability of the first DC is that the first DC is capable of providing a service; or
when the quantity of non-faulty service modules that is comprised in the first status information is less than the quantity of non-faulty service modules that is comprised in the second status information, determining through arbitration that the subsequent service providing capability of the first DC is that the first DC is not capable of providing a service.

9. The method according to claim 1, wherein the first status information and the second status information respectively comprise a quantity of active service modules; and
wherein arbitrating, by the first ABS apparatus, a subsequent service providing capability of the first DC based on the first status information and the second status information comprises:
when the quantity of active service modules that is comprised in the first status information is greater than the quantity of active service modules that is comprised in the second status information, determining through arbitration that the subsequent service providing capability of the first DC is that the first DC is capable of providing a service; or
when the quantity of active service modules that is comprised in the first status information is less than the quantity of active service modules that is comprised in the second status information, determining through arbitration that the subsequent service providing capability of the first DC is that the first DC is not capable of providing a service.

10. An arbitration service (ABS) apparatus, comprising:
a processor; and
a non-transitory computer-readable storage medium storing a program to be executed by the processor, the program including instructions for:
detecting first status information of at least one first service module in a first data center (DC), wherein the ABS apparatus is located in the first DC, the first DC is connected to a second DC, and the second DC comprises a second ABS apparatus located in the second DC, and wherein the first status information of the at least one first service module comprises a weight of a first non-faulty service module, and the weight of the first non-faulty service module indicates an importance degree of the first non-faulty service module;
when it is determined that a communication link between the first DC and the second DC is faulty, obtain second status information, wherein the second status information is status information that is of at least one second service module in the second DC and that is detected by the second ABS apparatus, and the second status information is stored in the ABS apparatus, and wherein the second status information comprises a weight of a second non-faulty service module, and the weight of the second non-faulty service module indicates an importance degree of the second non-faulty service module; and
arbitrate a subsequent service providing capability of the first DC based on the first status information and the second status information, wherein arbitrating the subsequent service providing capability of the first DC based on the first status information and the second status information comprises:
when a sum of weights comprised in the first status information is greater than a sum of weights comprised in the second status information, determining through arbitration that the subsequent service providing capability of the first DC is that the first DC is capable of providing a service; or
when a sum of weights comprised in the first status information is less than a sum of weights comprised in the second status information, determining through arbitration that the subsequent service providing capability of the first DC is that the first DC is not capable of providing a service.

11. The ABS apparatus according to claim 10, wherein the first DC further comprises a first data synchronization module, the second DC further comprises a second data synchronization module, the first data synchronization module is connected to a third data synchronization module in a third DC, the second data synchronization module is connected to the third data synchronization module, and data synchronization is implemented among the first data synchronization module, the second data synchronization module, and the third data synchronization module;
wherein the program further comprises instructions for storing the first status information in the first data synchronization module; and
wherein the instruction for obtaining the second status information comprise instructions for:
reading the second status information from the first data synchronization module, wherein the second status information is stored in the second data synchronization module by the second ABS apparatus, and is synchronized to the first data synchronization module by using the third data synchronization module.

12. The ABS apparatus according to claim 11, wherein the program further includes instructions for:
    detecting a first network connection status of the communication link between the first DC and the second DC;
    storing the first network connection status in the first data synchronization module;
    reading a second network connection status from the first data synchronization module, wherein the second network connection status is a network connection status of the communication link that is between the first DC and the second DC and that is detected by the second ABS apparatus, and the second network connection status is stored in the second data synchronization module by the second ABS apparatus, and the second network connection status is synchronized to the first data synchronization module by using the third data synchronization module; and
    when both the first network connection status and the second network connection status are disconnected states, determining that the communication link between the first DC and the second DC is faulty.

13. The ABS apparatus according to claim 12, wherein the ABS apparatus is an active apparatus in a plurality of ABS apparatuses comprised in the first DC, and at least one second ABS apparatus in the plurality of ABS apparatuses is a standby apparatus; and
    wherein the instructions for detecting the first network connection status of the communication link between the first DC and the second DC is comprise instructions for:
        when detecting a network disconnection between the first DC and the second DC, determining a detection apparatus queue, wherein the detection apparatus queue comprises an active apparatus and at least one standby apparatus, and the detection apparatus queue is usable to detect network connectivity to the second DC; and
        when detecting that detection results obtained after all apparatuses in the detection apparatus queue perform detection for a first preset quantity of times are all network disconnected, determining that the first network connection status between the first DC and the second DC is a disconnected state; or
        when detecting that a detection result of any apparatus in the detection apparatus queue is network connected when a quantity of detection times does not exceed a first preset quantity of times, determining that the first network connection status between the first DC and the second DC is a connected state.

14. The ABS apparatus according to claim 13, wherein the program further comprises instructions for:
    increasing a heartbeat timeout duration of each service module of the ABS apparatus when a quantity of times of determining the detection apparatus queue in a first preset time period reaches a second preset quantity of times, and active/standby switching of service modules is performed for a third preset quantity of times in a second preset time period.

15. The ABS apparatus according to claim 14, wherein the program comprises instructions for:
    obtaining a network QoS parameter when the quantity of times of determining the detection apparatus queue in the first preset time period reaches the second preset quantity of times; and
    increasing the heartbeat timeout duration of each service module when the network QoS parameter is greater than a preset threshold, and the active/standby switching of service modules is performed for the third preset quantity of times in the second preset time period.

* * * * *